United States Patent
Liu

(10) Patent No.: US 10,893,426 B2
(45) Date of Patent: Jan. 12, 2021

(54) CHANNEL QUALITY INFORMATION CALCULATION METHOD, APPARATUS, AND SYSTEM

(71) Applicant: HUAWEI TECHNOLOGIES CO., LTD., Guangdong (CN)

(72) Inventor: Kunpeng Liu, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 2 days.

(21) Appl. No.: 16/264,333

(22) Filed: Jan. 31, 2019

(65) Prior Publication Data

US 2019/0166514 A1 May 30, 2019

Related U.S. Application Data

(63) Continuation of application No. PCT/CN2017/096196, filed on Aug. 7, 2017.

(30) Foreign Application Priority Data

Aug. 10, 2016 (CN) .......................... 2016 1 0658300

(51) Int. Cl.
*H04L 12/26* (2006.01)
*H04W 24/08* (2009.01)
*H04L 1/00* (2006.01)
*H04L 1/20* (2006.01)
*H04L 5/00* (2006.01)

(52) U.S. Cl.
CPC ........... *H04W 24/08* (2013.01); *H04L 1/0026* (2013.01); *H04L 1/20* (2013.01); *H04L 5/0048* (2013.01); *H04L 5/0057* (2013.01)

(58) Field of Classification Search
CPC ........... H04B 7/04; H04L 1/0026; H04L 1/20; H04L 5/0048; H04L 5/0057; H04W 24/08
See application file for complete search history.

(56) References Cited

U.S. PATENT DOCUMENTS

2011/0032839 A1\* 2/2011 Chen ..................... H04B 7/024
370/252
2011/0255431 A1 10/2011 Wang et al.
(Continued)

FOREIGN PATENT DOCUMENTS

| CN | 101674655 A | 3/2010 |
| CN | 102684850 A | 9/2012 |

(Continued)

*Primary Examiner* — Minh Trang T Nguyen
(74) *Attorney, Agent, or Firm* — Womble Bond Dickinson (US) LLP

(57) ABSTRACT

Embodiments of the application relate to the communications field, and disclose a channel quality information calculation method, apparatus, and system. The method includes: receiving, by a terminal, a downlink configuration instruction sent by an access network device; performing, by the terminal, measurement on a reference signal resource indicated by the downlink configuration instruction, to obtain first channel quality information, and sending the first channel quality information to the access network device; sending, by the terminal, an SRS to the access network device; and calculating, by the access network device, second channel quality information based on the first channel quality information and the SRS.

15 Claims, 12 Drawing Sheets

(56) References Cited

U.S. PATENT DOCUMENTS

| | | | |
|---|---|---|---|
| 2012/0250558 A1* | 10/2012 | Chung | H04L 1/0026 370/252 |
| 2013/0194940 A1* | 8/2013 | Li | H04J 11/0023 370/252 |
| 2013/0231125 A1 | 9/2013 | Jeon et al. | |
| 2014/0098761 A1* | 4/2014 | Lee | H04W 72/005 370/329 |
| 2014/0321313 A1* | 10/2014 | Seo | H04J 11/00 370/252 |
| 2014/0369224 A1* | 12/2014 | Nagata | H04L 5/0035 370/252 |
| 2015/0124673 A1* | 5/2015 | Ouchi | H04W 52/362 370/311 |
| 2015/0124688 A1 | 5/2015 | Xu et al. | |
| 2015/0208263 A1* | 7/2015 | Behravan | H04W 24/10 370/252 |
| 2015/0327093 A1* | 11/2015 | Yang | H04W 48/16 370/252 |
| 2016/0119037 A1* | 4/2016 | Won | H04W 24/10 370/328 |
| 2016/0157190 A1 | 6/2016 | Seo et al. | |
| 2016/0249243 A1* | 8/2016 | Kim | H04W 24/10 |
| 2017/0170931 A1* | 6/2017 | Kusashima | H04L 5/1469 |
| 2018/0063736 A1* | 3/2018 | Sadeghi | H04W 72/0446 |

FOREIGN PATENT DOCUMENTS

| | | |
|---|---|---|
| CN | 103190100 A | 7/2013 |
| CN | 105634658 A | 6/2016 |
| EP | 2509249 A1 | 10/2012 |
| EP | 3190820 A1 | 7/2017 |
| WO | 2012/124552 A1 | 9/2012 |
| WO | 2016/036174 A1 | 3/2016 |

* cited by examiner

CHANNEL QUALITY INFORMATION CALCULATION METHOD, APPARATUS, AND SYSTEM

CROSS-REFERENCE TO RELATED APPLICATIONS

This application is a continuation of International Application No. PCT/CN2017/096196, filed on Aug. 7, 2017, which claims priority to Chinese Patent Application No. 201610658300.8, filed on Aug. 10, 2016, The disclosures of the aforementioned applications are herein incorporated by reference in their entireties.

TECHNICAL FIELD

Embodiments of this application relate to the communications field, and in particular, to a channel quality information calculation method, apparatus, and system.

BACKGROUND

In Long Term Evolution (LTE) technology, an evolved NodeB (eNB or e-NodeB) needs to learn of channel quality information of user equipment (UE) on a downlink channel, and sends downlink data to the UE based on the channel quality information of the downlink channel. A downlink refers to a link or a direction in which the eNB sends data to the UE.

In LTE using time division duplex (TDD), a channel quality information calculation method is provided, including: sending, by UE, a sounding reference signal (SRS) to an eNB; performing, by the eNB, calculation based on the SRS, to obtain channel estimation information of an uplink channel, and converting the channel estimation information of the uplink channel into channel estimation information of a downlink channel based on channel reciprocity; and sending, by the UE, a channel quality indicator (CQI) to the eNB, and performing, by the eNB, calculation based on a channel estimation result of the downlink channel and the CQI, to obtain channel quality information of the UE on the downlink channel.

Because the CQI sent by the UE to the eNB is an effective bandwidth CQI obtained after SNRs of subcarriers are combined and beamforming gains on the subcarriers are different, the foregoing CQI cannot accurately represent an interference status of the downlink channel, and as a result, the channel quality information that is in the downlink channel and that is obtained through calculation by the eNB is inaccurate.

SUMMARY

To resolve the prior-art problem that channel quality information that is of a downlink channel and that is obtained by an eNB is inaccurate, embodiments of this application provide a channel quality information calculation method, apparatus, and system. The technical solutions are as follows:

According to a first aspect of the embodiments of this application, a channel quality information calculation method is provided. The method includes: receiving, by a terminal, a downlink configuration instruction sent by an access network device; performing, by the terminal, measurement on a reference signal resource indicated by the downlink configuration instruction, to obtain first channel quality information, and sending the first channel quality information to the access network device, where the first channel quality information is used to feed back received signal information or interference information obtained through measurement on the reference signal resource; and sending, by the terminal, a sounding reference signal SRS to the access network device, where the first channel quality information and the SRS are used to calculate second channel quality information.

In conclusion, according to the channel quality information calculation method in this implementation, the terminal sends the first channel quality information to the access network device, where the first channel quality information is information obtained by the terminal through measurement on the downlink channel. Because the first channel quality information can more accurately represent an interference status of the downlink channel, the prior-art problem that the channel quality information that is in the downlink channel and that is obtained through calculation by the eNB is inaccurate is resolved. In this way, the access network device performs calculation based on the first channel quality information and the SRS to obtain the second channel quality information, and the second channel quality information can accurately represent channel quality of the downlink channel.

In one embodiment, the first channel quality information includes: the received signal information; or a ratio of the received signal information to reference signal received power (RSRP) that is reported by the terminal.

In conclusion, use of the ratio of the received signal information to the RSRP can make a quantized interval of the first channel quality information smaller and a bit quantity after the quantization smaller, thereby reducing a volume of data that needs to be fed back by the terminal to the access network device.

In one embodiment, the reference signal resource corresponds to a plurality of reference signal ports; and the received signal information includes: information about a received signal that is on each reference signal port and that is measured on each receive antenna; or elements of a covariance matrix of the received signal; or main diagonal elements of the covariance matrix of the received signal; or one of the main diagonal elements of the covariance matrix of the received signal; or an average value of the main diagonal elements of the covariance matrix of the received signal; or one of the main diagonal elements of the covariance matrix of the received signal, and differential values of other main diagonal elements relative to the main diagonal element; or the average value of the main diagonal elements of the covariance matrix of the received signal, and differential values of the main diagonal elements relative to the average value.

In conclusion, the terminal feeds back only some matrix elements in the covariance matrix to the access network device, so that a data volume when the terminal feeds back the first channel quality information can be reduced, thereby reducing transmission resources required for the first channel quality information.

In one embodiment, the first channel quality information includes: the interference information; or a ratio of the interference information to reference signal received power RSRP that is reported by the terminal.

Use of the ratio of the interference information to the RSRP can make a quantized interval of the first channel quality information smaller and a bit quantity after the quantization smaller, thereby reducing a volume of data that needs to be fed back by the terminal to the access network device.

In one embodiment, the interference information includes: the interference signal that is on each reference signal port and that is measured on each receive antenna; or a covariance matrix of the interference signal; or main diagonal elements of the covariance matrix of the interference signal; or one of the main diagonal elements of the covariance matrix of the interference signal; or an average value of the main diagonal elements of the covariance matrix of the interference signal; or one of the main diagonal elements of the covariance matrix of the interference signal, and differential values of other main diagonal elements relative to the main diagonal element; or the average value of the main diagonal elements of the covariance matrix of the interference signal, and differential values of the main diagonal elements relative to the average value.

In conclusion, the terminal feeds back only some matrix elements in the covariance matrix to the access network device, so that a data volume when the terminal feeds back the first channel quality information can be reduced, thereby reducing transmission resources required for the first channel quality information.

In one embodiment, the RSRP is latest reported RSRP; or the RSRP is latest reported RSRP, and the RSRP and a downlink reference signal transmitted on the reference signal resource have a same beam index.

In one embodiment, a signal obtained through measurement on the reference signal resource is a non-zero-power reference signal.

In one embodiment, non-zero-power reference signals between cells belonging to one cell group occupy a same time-frequency resource in a physical resource block (PRB); or non-zero-power reference signals between all cells occupy a same time-frequency resource in a physical resource block PRB.

In one embodiment, a signal obtained through measurement on the reference signal resource is a zero-power reference signal.

Since the access network device does not need to send a channel state information-reference signals (CSI-RS) for a zero-power CSI-RS, transmit resources that the access network device needs to consume can be reduced. Further, a calculation amount of the terminal can be reduced, so that calculation load of the terminal is reduced.

In one embodiment, the first channel quality information further includes transmit power information of the terminal when the terminal sends the SRS.

In one embodiment, the first channel quality information further includes a receiver type or a receiver processing gain of the terminal.

In conclusion, since there are many receiver types of the terminal, the terminal further adds the receiver type or the receiver processing gain to the first channel quality information, to more accurately calculate an SNR of the downlink channel. The access network device can select, based on the receiver type or the receiver processing gain, a proper calculation formula to calculate the second channel quality information.

In one embodiment, a frequency domain bandwidth corresponding to the reference signal resource includes n subbands, where the subbands correspond to respective first channel quality information, and n is a positive integer. Alternatively, widebands within a frequency domain bandwidth corresponding to the reference signal resource can correspond to same first channel quality information.

In one embodiment, a time domain resource occupied by the reference signal resource, a time domain resource occupied by the SRS, and a time domain resource occupied by the first channel quality information can belong to a same time domain unit, where the time domain unit is a timeslot, a subframe, or a transmission time interval.

In one embodiment, the time domain unit includes n symbols, where n is a positive integer. The reference signal resource occupies $X1^{th}$ to $X2^{th}$ OFDM symbols in the time domain unit, $0 \le X1$, $X2=X1$ or $X1+m1$, where m1 is an integer greater than or equal to 1. The SRS occupies $X3^{th}$ to $X4^{th}$ OFDM symbols in the time domain unit, $X3=X2+m2$, wherein m2 is an integer greater than or equal to 1, and $X3 \le X4$. The first channel quality information occupies $X5^{th}$ to $X6^{th}$ OFDM symbols in the time domain unit, and $X5 \le X6 \le n-1$.

In one embodiment, the time domain unit includes n symbols, where n is a positive integer. The sounding reference signal occupies $X1^{th}$ to $X2^{th}$ OFDM symbols in the time domain unit, $0 \le X1$, $X2=X1$ or $X1+m1$, where m1 is an integer greater than or equal to 1. The SRS occupies $X3^{th}$ to $X4^{th}$ OFDM symbols in the time domain unit, and $X3=X2+m2$, wherein m2 is an integer greater than or equal to 1, and $X4=X3$ or $X3+1$. The first channel quality information occupies $X5^{th}$ to $X6^{th}$ OFDM symbols in the time domain unit, and $X4<X5 \le X6 \le n-1$.

In one embodiment, the SRS occupies a plurality of OFDM symbols in time domain and occupies a plurality of frequency domain units in frequency domain. The SRS is transmitted in a frequency hopping manner within the plurality of frequency domain units. The sounding reference signal in different OFDM symbols occupies different frequency domain units. The different frequency domain units belong to non-contiguous frequency domain bandwidths or contiguous frequency domain bandwidths.

In one embodiment, in a same time domain unit, a frequency domain unit occupied by the first channel quality information is the same as the frequency domain unit corresponding to a last orthogonal frequency division multiplexing (OFDM) symbol occupied by the SRS. The SRS in the last OFDM symbol is a demodulation pilot signal of the first channel quality information.

In one embodiment, the time domain unit includes n symbols, and n is a positive integer The reference signal resource occupies $X1^{th}$ to $X2^{th}$ OFDM symbols in the time domain unit, $0 \le X1$, $X2=X1$ or $X1+m1$, where m1 is an integer greater than or equal to 1. The SRS and the first channel quality information sequentially and alternately occupy different OFDM symbols of $Z3^{th}$ to $Z4^{th}$ OFDM symbols in the time domain unit, and $X2 \le X3 \le X4 \le n-1$.

In one embodiment, the time domain unit includes n symbols, and n is a positive integer. The reference signal resource occupies $X1^{th}$ to $X2^{th}$ OFDM symbols in the time domain unit, $0 \le X1$, $X2=X1$ or $X1+m1$, where m1 is an integer greater than or equal to 1. The SRS and the first channel quality information occupy same $Z3^{th}$ to $Z4^{th}$ OFDM symbols in the time domain unit, and $X2<X3 \le X4 \le n-1$.

In one embodiment, the SRS and the first channel quality information respectively occupy two groups of subcarriers within a same frequency domain bandwidth in frequency domain. The two groups of subcarriers respectively correspond to odd-numbered subcarriers and even-numbered subcarriers.

In one embodiment, the SRS in each OFDM symbol uses a sequence resource and a different cyclic shift value. The cyclic shift value is used to indicate the first channel quality information.

In one embodiment, the downlink configuration instruction occupies first k OFDM symbols in the time domain unit, and k=1 or 2 or 3 or 4.

In one embodiment, the downlink configuration instruction is further used to configure a first time-frequency resource, where the first time-frequency resource is a time-frequency resource for transmitting the SRS.

In one embodiment, the downlink configuration instruction is further used to configure a sequence resource of the SRS, or the sequence resource and a code resource of the SRS.

In one embodiment, the downlink configuration instruction is further used to configure a second time-frequency resource, where the second time-frequency resource is a time-frequency resource for transmitting the first channel quality information.

In one embodiment, the downlink configuration instruction further includes an instruction for triggering the terminal to report the first channel quality information.

In one embodiment, the downlink configuration instruction is used to configure an OFDM symbol position and/or a physical resource block PRB position corresponding to the reference signal resource. The OFDM symbol position includes: an index of a start symbol occupied by the reference signal resource and a total quantity of symbols occupied by the reference signal resource, or the index of a start symbol and an index of an end symbol occupied by the reference signal resource. The PRB position includes indexes of PRBs in all transmission bandwidths occupied by the reference signal resource, where the plurality of PRBs are non-contiguous PRBs or contiguous PRBs.

In one embodiment, the downlink configuration instruction is used to configure an OFDM symbol position and/or a physical resource block PRB position corresponding to the first time-frequency resource. The OFDM symbol position includes: an index of a start symbol occupied by the SRS and a total quantity of symbols occupied by the SRS, or the index of a start symbol and an index of an end symbol occupied by the SRS. The PRB position includes indexes of PRBs in all transmission bandwidths occupied by the SRS. The SRS is transmitted in the transmission bandwidth through frequency hopping, and the plurality of PRBs are non-contiguous PRBs or contiguous PRBs, where the transmission bandwidths occupied by the SRS in each OFDM symbol are the same or different.

In one embodiment, the downlink configuration instruction is used to configure an OFDM symbol position and/or a physical resource block PRB position corresponding to the second time-frequency resource. The OFDM symbol position includes: an index of a start symbol occupied by the first channel quality information and a total quantity of symbols occupied by the first channel quality information, or the index of a start symbol and an index of an end symbol occupied by the first channel quality information. The PRB position includes indexes of PRBs in all transmission bandwidths occupied by the first channel quality information, where the plurality of PRBs are non-contiguous PRBs or contiguous PRBs.

In one embodiment, the downlink configuration instruction is a UE-specific instruction, or a UE group-specific instruction.

According to a second aspect of the embodiments of this application, a channel quality information calculation method is provided. The method includes: sending, by an access network device, a downlink configuration instruction to a terminal; receiving, by the access network device, first channel quality information sent by the terminal, where the first channel quality information is obtained by the terminal through measurement on a reference signal resource indicated by the downlink configuration instruction; and receiving, by the access network device, a sounding reference signal SRS sent by the terminal according to the downlink configuration instruction, where the first channel quality information and the SRS are used to calculate second channel quality information.

In one embodiment, the method further includes: obtaining, by the access network device, received signal information of the terminal from the first channel quality information; performing, by the access network device, calculation based on the SRS, to obtain channel estimation information of a downlink channel of the terminal; performing, by the access network device, calculation based on the received signal information and the channel estimation information of the downlink channel, to obtain interference information; and performing, by the access network device, calculation based on the interference information and the channel estimation information of the downlink channel, to obtain a signal-to-noise ratio (SNR) of the downlink channel, and determining the SNR as the second channel quality information.

In one embodiment, the method further includes: obtaining, by the access network device, interference information of the terminal from the first channel quality information; performing, by the access network device, calculation based on the SRS, to obtain channel estimation information of a downlink channel of the terminal; and performing, by the access network device, calculation based on the interference information and the channel estimation information of the downlink channel, to obtain a signal-to-noise ratio SNR of the downlink channel, and determining the SNR as the second channel quality information.

In one embodiment, the first channel quality information includes: the received signal information; or a ratio of the received signal information to RSRP that is reported by the terminal.

In one embodiment, the reference signal resource corresponds to a plurality of reference signal ports. The received signal information includes: information about a received signal that is on each reference signal port and that is measured on each receive antenna; or elements of a covariance matrix of the received signal; or main diagonal elements of the covariance matrix of the received signal; or one of the main diagonal elements of the covariance matrix of the received signal; or an average value of the main diagonal elements of the covariance matrix of the received signal; or one of the main diagonal elements of the covariance matrix of the received signal, and differential values of other main diagonal elements relative to the main diagonal element; or the average value of the main diagonal elements of the covariance matrix of the received signal, and differential values of the main diagonal elements relative to the average value.

In one embodiment, the first channel quality information includes: the interference information; or a ratio of the interference information to RSRP that is reported by the terminal.

In one embodiment, the interference information includes: the interference signal that is on each reference signal port and that is measured on each receive antenna; or a covariance matrix of the interference signal; or main diagonal elements of the covariance matrix of the interference signal; or one of the main diagonal elements of the covariance matrix of the interference signal; or an average value of the main diagonal elements of the covariance matrix of the interference signal; or one of the main diagonal elements of the covariance matrix of the interference signal, and differential values of other main diagonal elements relative to the main diagonal element; or the average value of the main diagonal elements of the covariance matrix of the interference signal, and differential values of the main diagonal elements relative to the average value.

In one embodiment, the RSRP is a latest reported RSRP. In one embodiment, the RSRP is latest a reported RSRP, and the RSRP and a downlink reference signal transmitted on the reference signal resource have a same beam index.

In one embodiment, a signal obtained through measurement on the reference signal resource is a non-zero-power reference signal.

In one embodiment, non-zero-power reference signals between cells belonging to one cell group occupy a same time-frequency resource in a physical resource block PRB. In one embodiment, non-zero-power reference signals between all cells occupy a same time-frequency resource in a physical resource block PRB.

In one embodiment, a signal obtained through measurement on the reference signal resource is a zero-power reference signal.

In one embodiment, the first channel quality information further includes transmit power information of the terminal when the terminal sends the SRS.

In one embodiment, the first channel quality information further includes a receiver type or a receiver processing gain of the terminal.

In one embodiment, a frequency domain bandwidth corresponding to the reference signal resource includes n subbands, where the subbands correspond to respective first channel quality information, and n is a positive integer. In one embodiment, widebands within a frequency domain bandwidth corresponding to the reference signal resource correspond to same first channel quality information.

In one embodiment, a time domain resource occupied by the reference signal resource, a time domain resource occupied by the SRS, and a time domain resource occupied by the first channel quality information belong to a same time domain unit, where the time domain unit is a timeslot, a subframe, or a transmission time interval.

In one embodiment, the time domain unit includes n symbols, and n is a positive integer. The reference signal resource occupies $X1^{th}$ to $X2^{th}$ OFDM symbols in the time domain unit, $0 \leq X1$, $X2=X1$ or $X1+m1$, where m1 is an integer greater than or equal to 1. The SRS occupies $X3^{th}$ to $X4^{th}$ OFDM symbols in the time domain unit, where $X3=X2+m2$, m2 is an integer greater than or equal to 1, and $X3 \leq X4$. The first channel quality information occupies $X5^{th}$ to $X6^{th}$ OFDM symbols in the time domain unit, and $X5 \leq X6 \leq n-1$.

In one embodiment, the time domain unit includes n symbols, and n is a positive integer. The sounding reference signal occupies $X1^{th}$ to $X2^{th}$ OFDM symbols in the time domain unit, $0 \leq X1$, $X2=X1$ or $X1+m1$, where m1 is an integer greater than or equal to 1. The SRS occupies $X3^{th}$ to $X4^{th}$ OFDM symbols in the time domain unit, $X3=X2+m2$, where m2 is an integer greater than or equal to 1, and $X4=X3$ or $X3+1$. The first channel quality information occupies $X5^{th}$ to $X6^{th}$ OFDM symbols in the time domain unit, and $X4<X5 \leq X6 \leq n-1$.

In one embodiment, the SRS occupies a plurality of OFDM symbols in time domain and occupies a plurality of frequency domain units in frequency domain. The SRS is transmitted in a frequency hopping manner within the plurality of frequency domain units. The sounding reference signal in different OFDM symbols occupies different frequency domain units. The different frequency domain units belong to non-contiguous frequency domain bandwidths or contiguous frequency domain bandwidths.

In one embodiment, in a same time domain unit, a frequency domain unit occupied by the first channel quality information is the same as the frequency domain unit corresponding to a last OFDM symbol occupied by the SRS. The SRS in the last OFDM symbol is a demodulation pilot signal of the first channel quality information.

In one embodiment, the time domain unit includes n symbols, and n is a positive integer. The reference signal resource occupies $X1^{th}$ to $X2^{th}$ OFDM symbols in the time domain unit, $0 \leq X1$, $X2=X1$ or $X1+m1$, where m1 is an integer greater than or equal to 1. The SRS and the first channel quality information sequentially and alternately occupy different OFDM symbols of $Z3^{th}$ to $Z4^{th}$ OFDM symbols in the time domain unit, and $X2 \leq X3 \leq X4 \leq n-1$.

In one embodiment, the time domain unit includes n symbols, and n is a positive integer. The reference signal resource occupies $X1^{th}$ to $X2^{th}$ OFDM symbols in the time domain unit, $0 \leq X1$, $X2=X1$ or $X1+m1$, where m1 is an integer greater than or equal to 1. The SRS and the first channel quality information occupy same $Z3^{th}$ to $Z4^{th}$ OFDM symbols in the time domain unit, and $X2<X3 \leq X4 \leq n-1$.

In one embodiment, the SRS and the first channel quality information respectively occupy two groups of subcarriers within a same frequency domain bandwidth in frequency domain. The two groups of subcarriers respectively correspond to odd-numbered subcarriers and even-numbered subcarriers.

In one embodiment, the SRS in each OFDM symbol uses a sequence resource and a different cyclic shift value, and the cyclic shift value is used to indicate the first channel quality information.

In one embodiment, the downlink configuration instruction occupies first k OFDM symbols in the time domain unit, and k=1 or 2 or 3 or 4.

In one embodiment, the downlink configuration instruction is further used to configure a first time-frequency resource, where the first time-frequency resource is a time-frequency resource for transmitting the SRS.

In one embodiment, the downlink configuration instruction is further used to configure a sequence resource of the SRS, or the sequence resource and a code resource of the SRS.

In one embodiment, the downlink configuration instruction is further used to configure a second time-frequency resource, where the second time-frequency resource is a time-frequency resource for transmitting the first channel quality information.

In one embodiment, the downlink configuration instruction further includes an instruction for triggering the terminal to report the first channel quality information.

In one embodiment, the downlink configuration instruction is used to configure an OFDM symbol position and/or a physical resource block PRB position corresponding to the reference signal resource. The OFDM symbol position includes: an index of a start symbol occupied by the reference signal resource and a total quantity of symbols occupied by the reference signal resource, or the index of a start symbol and an index of an end symbol occupied by the reference signal resource; and the PRB position includes indexes of PRBs in all transmission bandwidths occupied by the reference signal resource, where the plurality of PRBs are non-contiguous PRBs or contiguous PRBs.

In one embodiment, the downlink configuration instruction is used to configure an OFDM symbol position and/or a physical resource block PRB position corresponding to the first time-frequency resource. The OFDM symbol position includes: an index of a start symbol occupied by the reference signal resource and a total quantity of symbols occupied by the reference signal resource, or the index of a start symbol and an index of an end symbol occupied by the reference signal resource; and the PRB position includes indexes of PRBs in all transmission bandwidths occupied by the SRS, where the SRS is transmitted in the transmission bandwidth through frequency hopping, and the plurality of PRBs are non-contiguous PRBs or contiguous PRBs, where the transmission bandwidths occupied by the SRS in each OFDM symbol are the same or different.

In one embodiment, the downlink configuration instruction is used to configure an OFDM symbol position and/or a physical resource block PRB position corresponding to the second time-frequency resource. The OFDM symbol position includes: an index of a start symbol occupied by the first channel quality information and a total quantity of symbols occupied by the first channel quality information, or the index of a start symbol and an index of an end symbol occupied by the first channel quality information; and the PRB position includes indexes of PRBs in all transmission bandwidths occupied by the first channel quality information, where the plurality of PRBs are non-contiguous PRBs or contiguous PRBs.

According to a third aspect, an embodiment of this application provides a channel quality information calculation apparatus. The channel quality information calculation apparatus includes at least one unit. The at least one unit is used to implement the channel quality information calculation method according to any one of the first aspect or the possible implementations of the first aspect.

According to a fourth aspect, an embodiment of this application provides a channel quality information calculation apparatus. The channel quality information calculation apparatus includes at least one unit. The at least one unit is used to implement the channel quality information calculation method according to any one of the second aspect or the possible implementations of the second aspect.

According to a fifth aspect, an embodiment of this application provides a terminal. The terminal includes a processor and a memory. The memory is configured to store one or more instructions. The instructions are instructed to be executed by the processor. The processor is configured to execute the instruction to implement the channel quality information calculation method according to any one of the first aspect or the possible implementations of the first aspect.

According to a sixth aspect, an embodiment of this application provides an access network device. The access network device includes a processor and a memory. The memory is configured to store one or more instructions. The instructions are instructed to be executed by the processor. The processor is configured to execute the instruction to implement the channel quality information calculation method according to any one of the second aspect or the possible implementations of the second aspect.

According to a seventh aspect, an embodiment of this application provides a computer readable storage medium. The computer readable storage medium stores an executable program for implementing the channel quality information calculation method according to any one of the first aspect or the possible designs of the first aspect.

According to an eighth aspect, an embodiment of this application provides a computer readable storage medium. The computer readable storage medium stores an executable program for implementing the channel quality information calculation method according to any one of the second aspect or the possible designs of the second aspect.

According to a ninth aspect, an embodiment of this application provides a channel quality information calculation system. The channel quality information calculation system includes a terminal and an access network device. The terminal includes the channel quality information calculation apparatus according to any one of the third aspect or the possible designs of the third aspect. The access network device includes the channel quality information calculation apparatus according to any one of the fourth aspect or the possible designs of the fourth aspect.

According to a tenth aspect, an embodiment of this application provides a channel quality information calculation system. The channel quality information calculation system includes a terminal and an access network device. The terminal includes the channel quality information calculation apparatus according to any one of the fifth aspect or the possible designs of the fifth aspect. The access network device includes the channel quality information calculation apparatus according to any one of the sixth aspect or the possible designs of the sixth aspect.

DESCRIPTION OF EMBODIMENTS

To make the objectives, technical solutions, and advantages of this application clearer, the following further describes the implementations of this application in detail with reference to the accompanying drawings.

A "module" mentioned in this specification is a program or an instruction that is stored in a memory and can implement some functions. A "unit" mentioned in this specification is a functional structure divided based on logic. The "unit" may be implemented by only hardware, or implemented by a combination of software and hardware.

In this specification, "a plurality of" means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
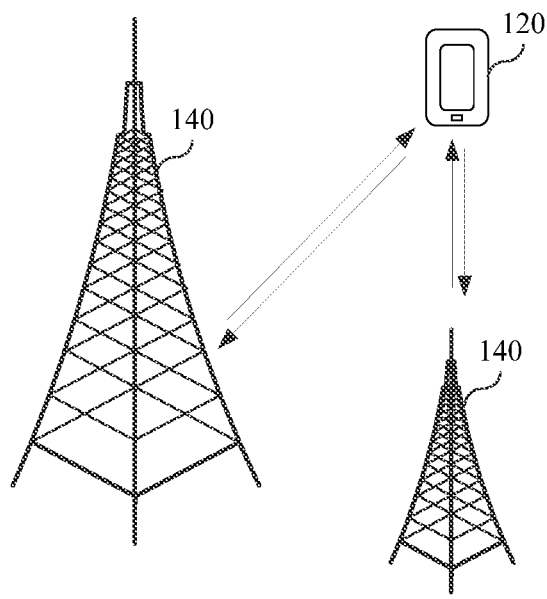
FIG. 1 is a schematic structural diagram of a channel quality information calculation system according to an embodiment of this application.

FIG. 1 is a schematic structural diagram of a channel quality information calculation system 100 according to an embodiment of this application. The channel quality information calculation system 100 may be an LTE system or a 5G system. The channel quality information calculation system 100 includes at least one terminal 120 and at least one access network device 140.

The terminal 120 may be a device such as a personal communication service (PCS) phone, a cordless phone, a Session Initiation Protocol (SIP) phone, a wireless local loop (WLL) station, or a personal digital assistant (PDA). The terminal may also be referred to as a system, a subscriber unit, a subscriber station a mobile station, a mobile console, a remote station, an access point, a remote terminal, an access terminal, a user terminal, a user agent, a user device, or user equipment.

The terminal 120 communicates with one or more access network devices 140 by using a radio access network (RAN).

The access network device 140 may be a base station, functioning as a router between the terminal 120 and other parts of the access network. The other parts of the access network may include an Internet Protocol (IP) network. The base station may further coordinate attribute management of the air interface. For example, the base station may be a base transceiver station (BTS) in global system for mobile communications (GSM) or code-division multiple access (CDMA), or may be a NodeB in wideband code-division multiple access (WCDMA), or may be an evolved NodeB (eNB or e-NodeB, evolved NodeB) in long-term evolution (LTE), or a gNB in a 5G new radio (NR) system. The base station is not limited to the above examples in this application. In the following embodiment, an eNB is used as an example of the access network device 140.

Figure 2:
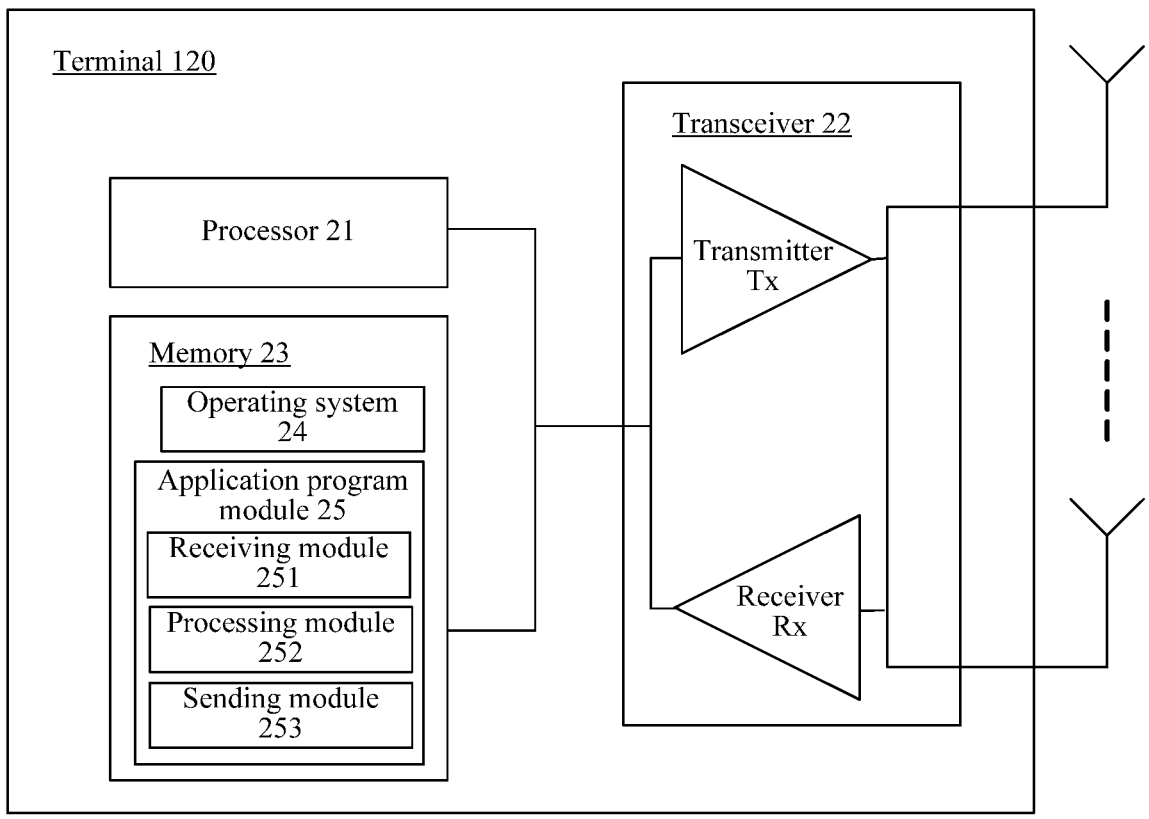
FIG. 2 is a structural block diagram of a terminal according to an embodiment of this application.

FIG. 2 is a structural block diagram of a terminal 120 according to an embodiment of this application. The terminal 120 includes a processor 21, a transceiver 22, and a memory 23.

The processor 21 includes one or more processing cores. The processor 21 runs a software program and module to execute various functional applications and perform information processing.

The transceiver 22 includes a receiver Rx and a transmitter Tx. The transceiver 22 may be further implemented as a communications chip. The communications chip may include a receive module, a transmit module, a modulation/demodulation module, and the like, to modulate/demodulate information, and receive or send the information by using a radio signal.

The memory 23 is connected to the processor 21.

The memory 23 may be configured to store a software program and module. The memory may store an operating system 24 and an application program module 25 described by at least one function.

The application program module 25 includes at least a receiving module 251 configured to receive information, a processing module 252 configured to process information, and a sending module 253 configured to send information.

The receiving module 251 is configured to receive a downlink configuration instruction sent by an access network device.

The processing module 252 is configured to: perform measurement on a reference signal resource indicated by the downlink configuration instruction, to obtain first channel quality information, and send the first channel quality information to the access network device, where the first channel quality information is used to feed back received signal information or interference information obtained through measurement on the reference signal resource.

The sending module 253 is configured to send a sounding reference signal SRS to the access network device.

The first channel quality information and the SRS are used to calculate second channel quality information. The second channel quality information is used to represent channel quality of a downlink channel of the terminal. In one embodiment, the second channel quality information is an SNR.

Figure 5:
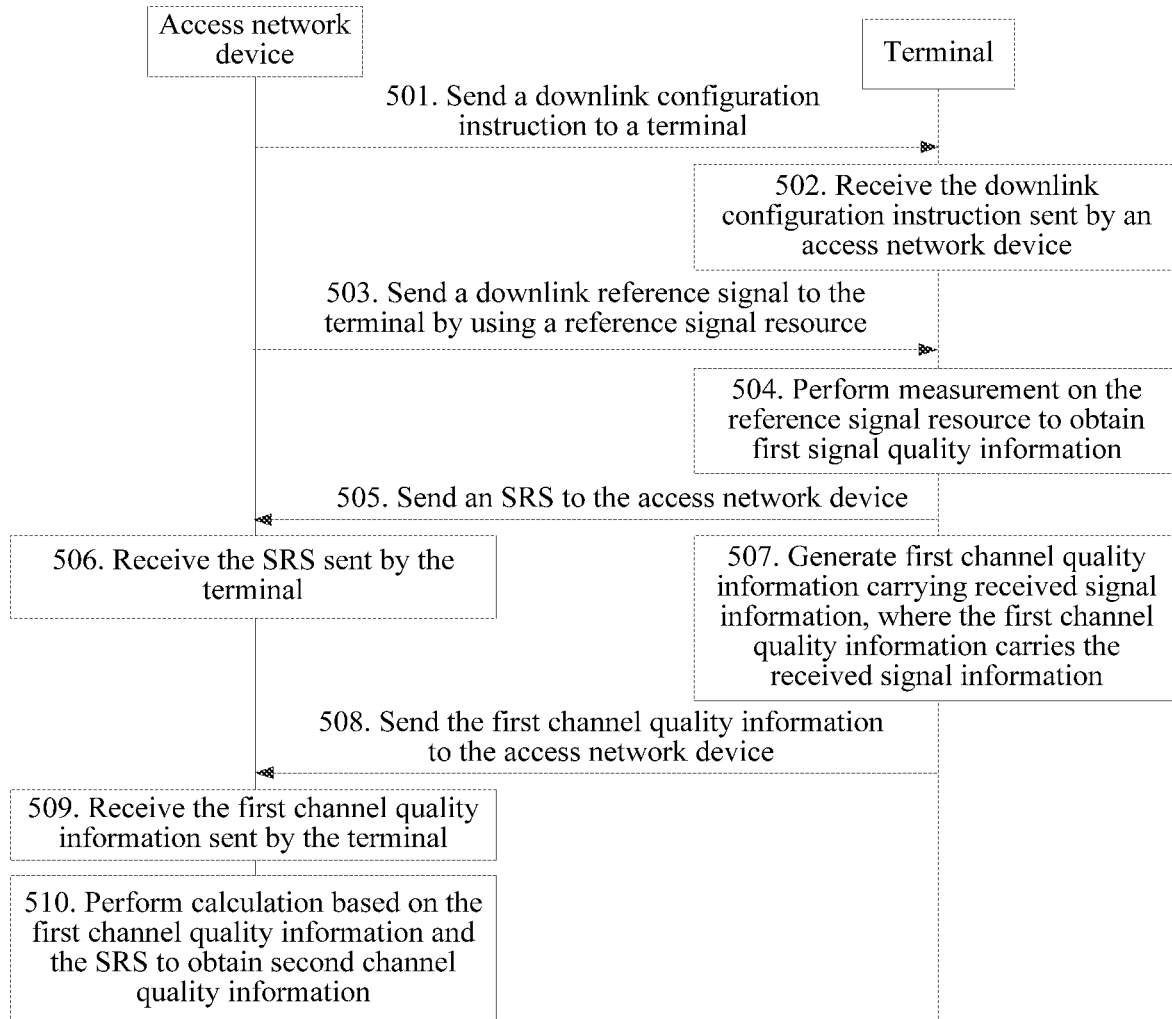
FIG. 5 is a flowchart of a channel quality information calculation method according to another embodiment of this application.
Figure 6:
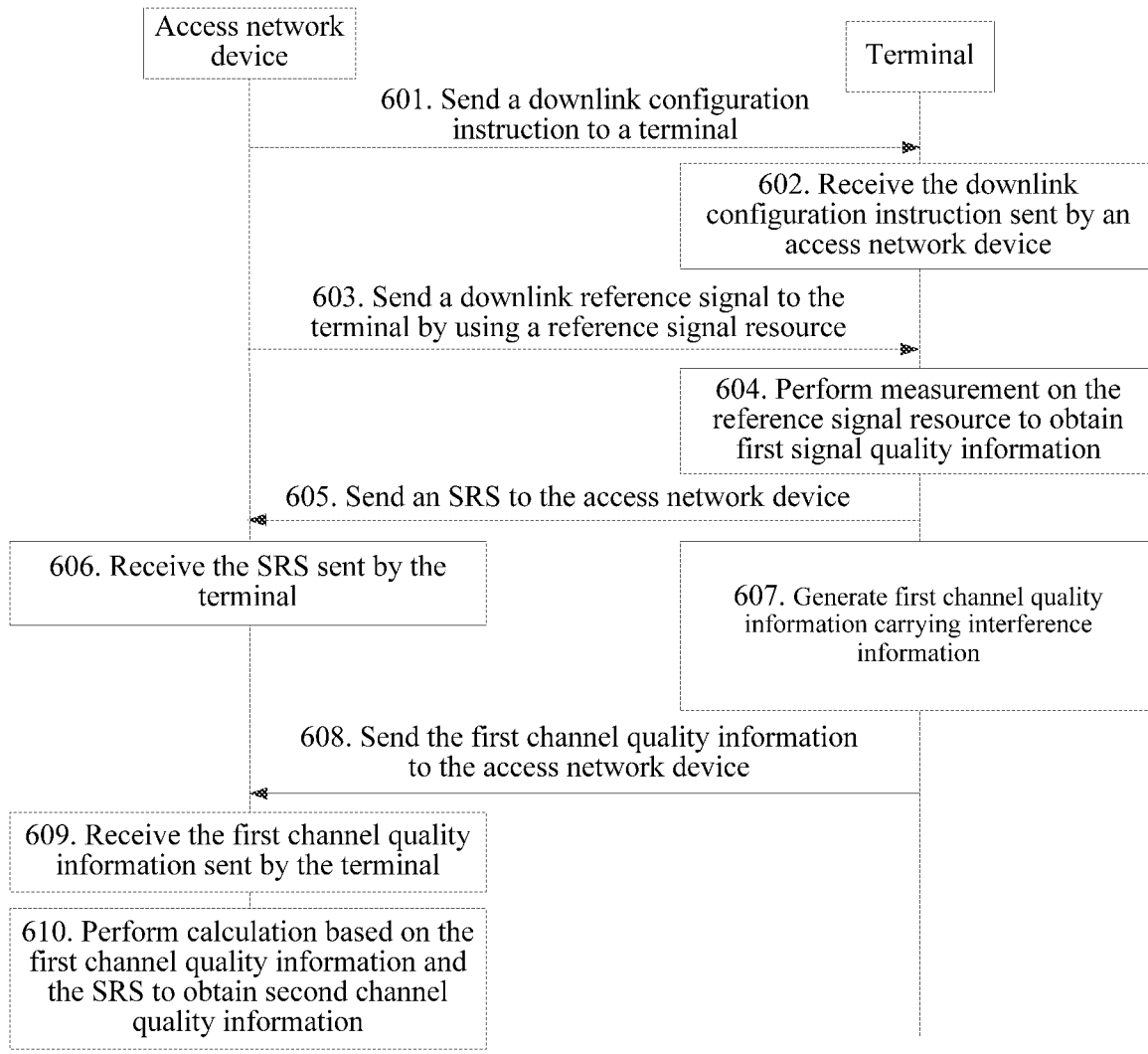
FIG. 6 is a flowchart of a channel quality information calculation method according to another embodiment of this application.
Figure 7:
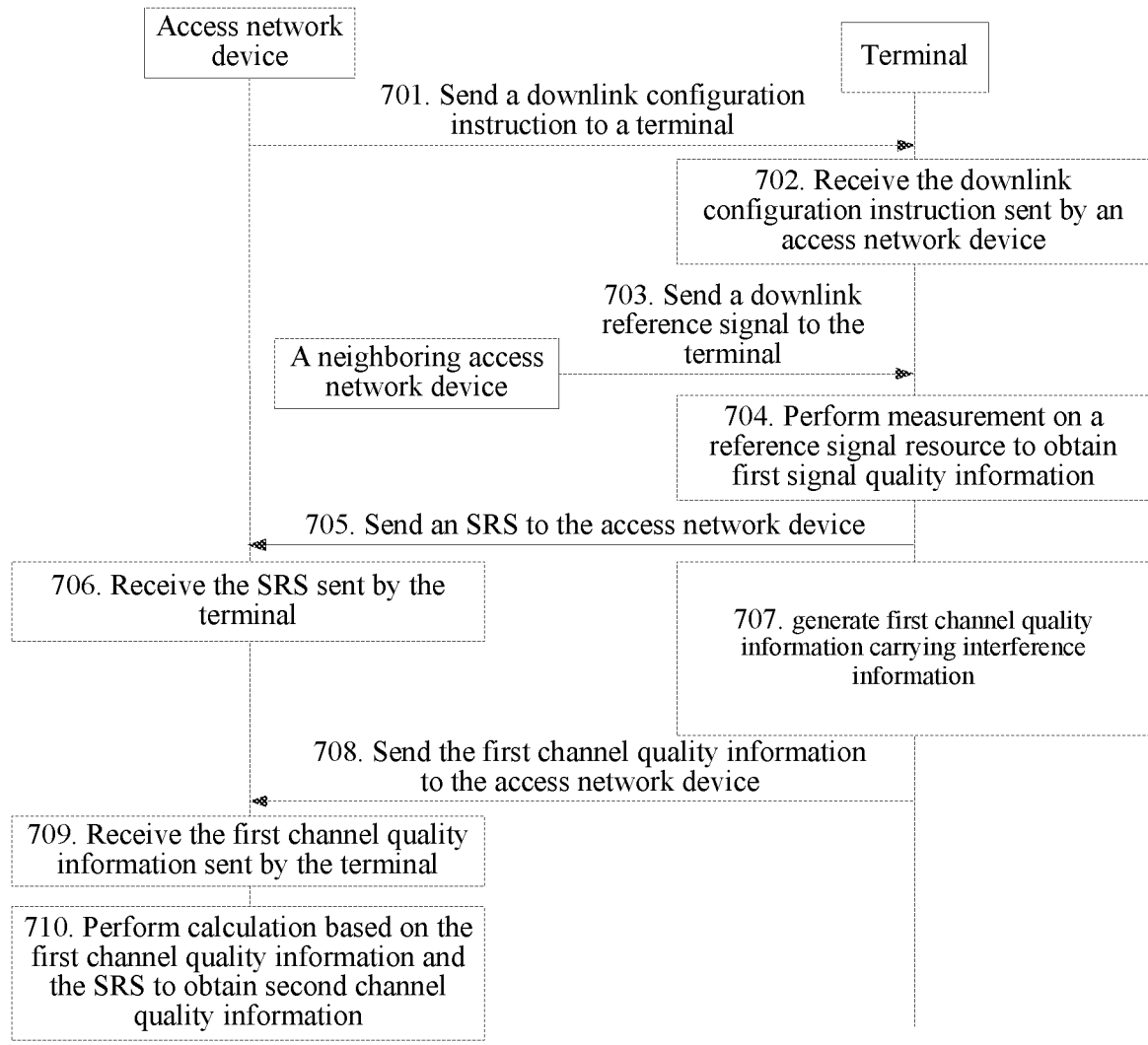
FIG. 7 is a flowchart of a channel quality information calculation method according to another embodiment of this application.

In one embodiment, the processor 21 is configured to execute modules in the application program module 25, to implement the following operations that need to be performed by the terminal in FIG. 5, FIG. 6, and FIG. 7.

In addition, the memory 23 is a computer readable storage medium, and may be implemented by a volatile or nonvolatile storage device of any type or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

A person skilled in the prior art may understand that, a structure of the terminal 120 shown in FIG. 2 does not constitute a limitation on the access network device, and components more or fewer than those shown in the figure may be included, or some components may be combined, or a different component deployment may be used.

Figure 3:
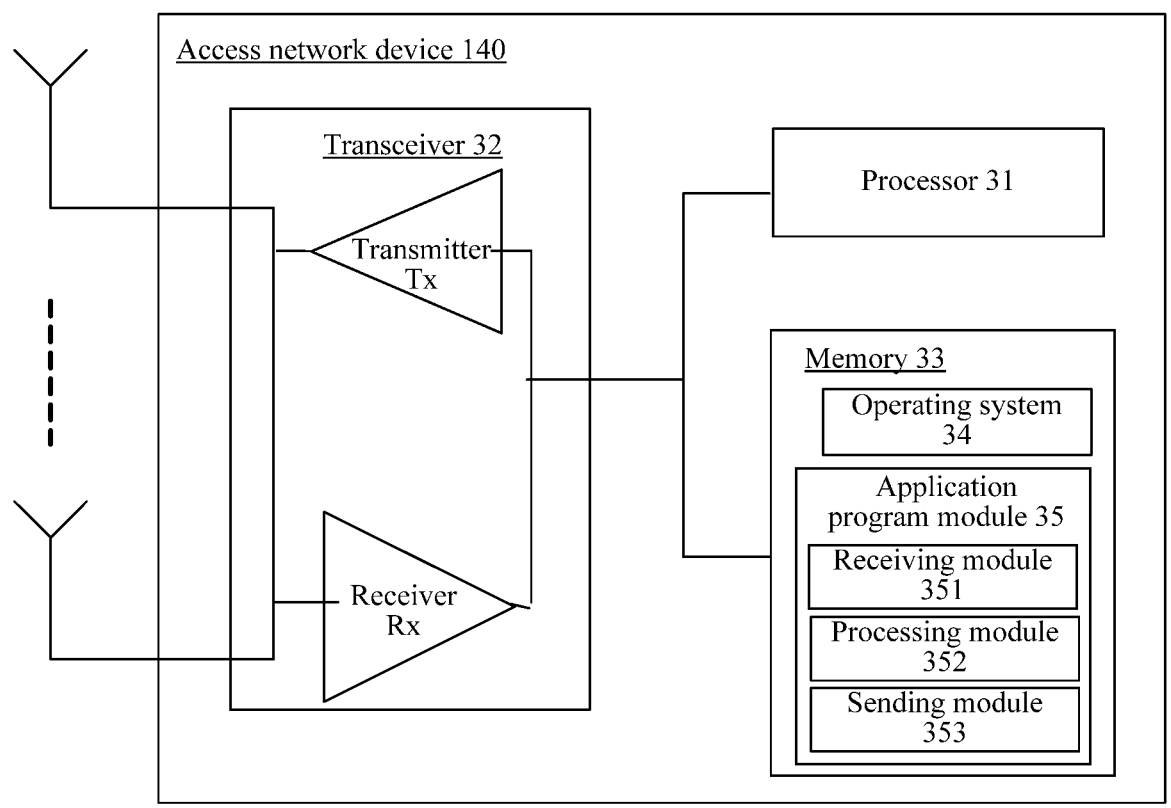
FIG. 3 is a structural block diagram of an access network device according to an embodiment of this application.

FIG. 3 is a structural block diagram of an access network device 140 according to an embodiment of this application. The access network device includes a processor 31, a transceiver 32, and a memory 33.

The processor 31 includes one or more processing cores. The processor 31 runs a software program and a module to execute various functional applications and perform information processing.

The transceiver 32 includes a receiver Rx and a transmitter Tx. The transceiver 32 may be further implemented as a communications chip. The communications chip may include a receive module, a transmit module, a modulation/demodulation module, and the like, to modulate/demodulate information, and receive or send the information by using a radio signal.

The memory 33 is connected to the processor 31.

The memory 33 may be configured to store a software program and module. The memory may store an operating system 34 and an application program module 35 described by at least one function.

The application program module 35 includes at least a receiving module 351 configured to receive information, a processing module 352 configured to process information, and a sending module 353 configured to send information. The sending module 353 is configured to send a downlink configuration instruction to a terminal. The receiving module 351 is configured to receive first channel quality information sent by the terminal, where the first channel quality information is obtained by the terminal through measurement on a reference signal resource indicated by the downlink configuration instruction. The receiving module 351 is configured to receive a sounding reference signal SRS sent by the terminal according to the downlink configuration instruction. The processing module 352 is configured to calculate second channel quality information based on the first channel quality information and the SRS. The second channel quality information is used to represent channel quality of a downlink channel of the terminal. In one embodiment, the second channel quality information is an SNR.

In one embodiment, the processor 31 is configured to execute modules in the application program module 35, to implement the following operations that need to be performed by the access network device in FIG. 5, FIG. 6, and FIG. 7.

In addition, the memory 33 is a computer readable medium, and may be implemented by a volatile or nonvolatile storage device of any type or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

A person skilled in the art may understand that, a structure of the access network device 140 shown in FIG. 3 does not constitute a limitation on the access network device, and components more or fewer than those shown in the figure may be included, or some components may be combined, or a different component deployment may be used.

Figure 4:
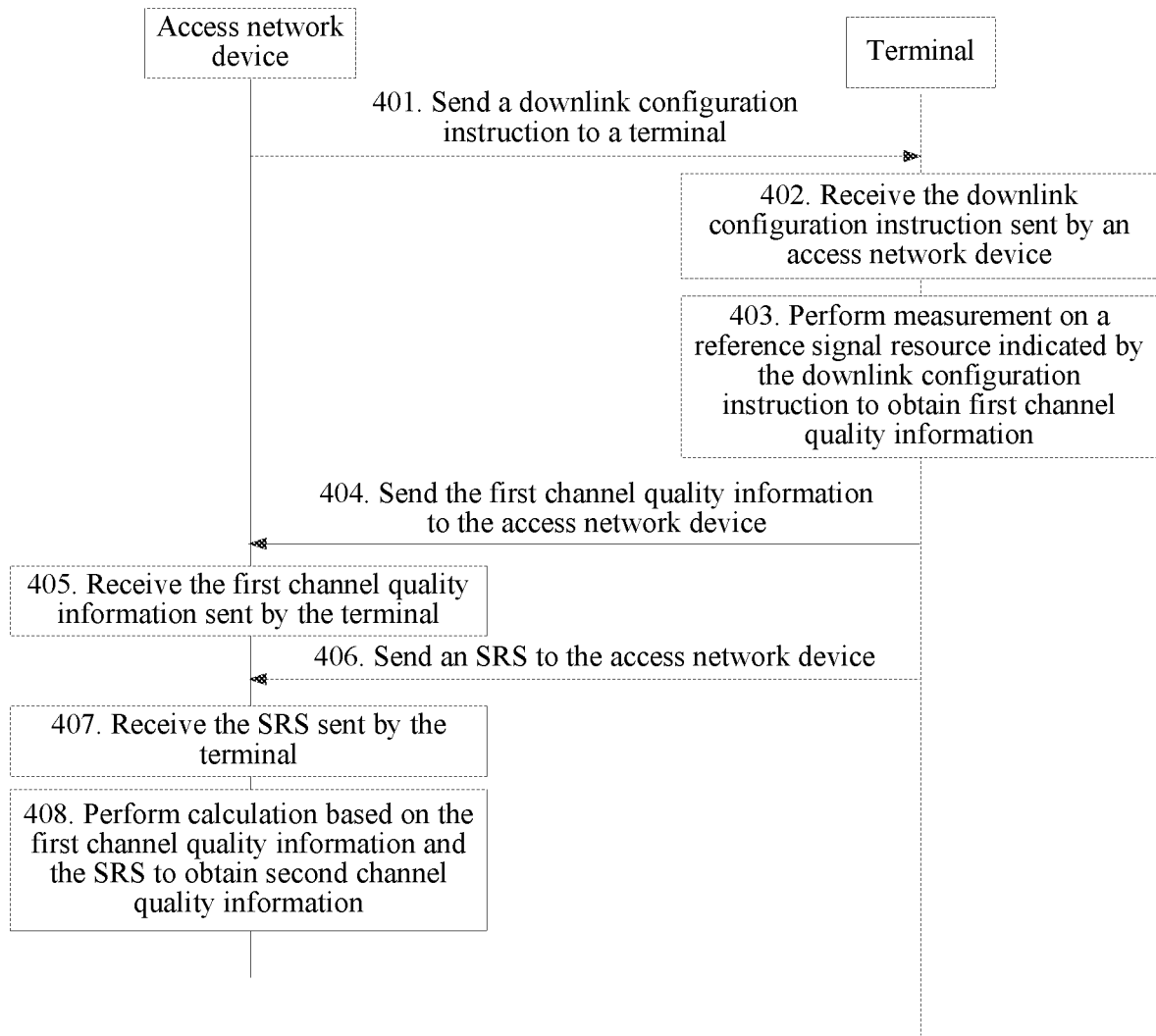
FIG. 4 is a flowchart of a channel quality information calculation method according to an embodiment of this application.

FIG. 4 is a flowchart of a channel quality information calculation method according to an embodiment of this application. In this embodiment, that the channel quality information calculation method is applied to the channel quality information calculation system shown in FIG. 1 is used as an example for description. The method includes the following operations.

In operation 401, an access network device sends a downlink configuration instruction to a terminal.

In one embodiment, the downlink configuration instruction is used to configure a reference signal resource. The reference signal resource is a time-frequency resource occupied by a downlink reference signal.

In operation 402, the terminal receives the downlink configuration instruction sent by the access network device.

In operation 403, the terminal performs measurement on a reference signal resource indicated by the downlink configuration instruction to obtain first channel quality information.

In one embodiment, the first channel quality information includes received signal information obtained through measurement on the reference signal resource, or interference information obtained through measurement on the reference signal resource. The received signal information is combined information of signal information sent by the access network device and the interference information. In this embodiment of this application, the interference information is information for describing a sum of interference and noise.

In one embodiment, the first channel quality information is represented in a form of channel state information (CSI).

In operation 404, the terminal sends the first channel quality information to the access network device.

In operation 405, the access network device receives the first channel quality information sent by the terminal.

In operation 406, the terminal sends an SRS to the access network device.

In operation 407, the access network device receives the SRS sent by the terminal.

In operation 408, the access network device performs calculation based on the first channel quality information and the SRS to obtain second channel quality information.

In one embodiment, the second channel quality information is used to represent channel quality of a downlink channel of the terminal. In one embodiment, the second channel quality information is represented in a form of an SNR of the downlink channel.

It should be noted that, operation 406 may be performed before operation 404, or operation 406 and operation 404 may be performed at the same time. This is not limited in this embodiment.

In conclusion, according to the channel quality information calculation method provided in this embodiment, the terminal sends the first channel quality information to the access network device, where the first channel quality information is information obtained by the terminal through measurement on the downlink channel. Because the first channel quality information can more accurately represent an interference status of the downlink channel, the prior-art problem that the channel quality information that is of the downlink channel and that is obtained through calculation by the eNB is inaccurate is resolved. In this way, the access network device performs calculation based on the first channel quality information and the SRS to obtain the second channel quality information, and the second channel quality information can accurately represent channel quality of the downlink channel.

In one embodiment, the downlink reference signal transmitted on the reference signal resource is a channel state information-reference signal (CSI-RS). There are two types of CSI-RSs: non-zero-power (NZP) CSI-RS and zero-power (ZP) CSI-RS.

The NZP CSI-RS is a CSI-RS sent by the access network device to the terminal. The ZP CSI-RS is a CSI-RS sent by the access network device neighboring to the access network device to the terminal.

For an implementation scenario of the NZP CSI-RS, the embodiments of this application provide an embodiment of FIG. 5 and an embodiment of FIG. 6 in parallel.

For an implementation scenario of the ZP CSI-RS, the embodiments of this application provide an embodiment of FIG. 7.

FIG. 5 is a flowchart of a channel quality information calculation method according to another embodiment of this application. In this embodiment, that the channel quality information calculation method is applied to the channel quality information calculation system shown in FIG. 1 is used as an example for description. The method includes the following operations.

In operation 501, an access network device sends a downlink configuration instruction to a terminal.

In one embodiment, the downlink configuration instruction is used to configure a reference signal resource. The reference signal resource is a time-frequency resource occupied by an NZP CSI-RS. A time domain resource includes an index of an orthogonal frequency division multiplexing technology (OFDM) symbol occupied by a CSI-RS. A frequency domain resource occupied by the CSI-RS includes a physical resource block (PRB) index. The NZP CSI-RS is briefly referred to as a CSI-RS below.

In one embodiment, the downlink configuration instruction is further used to configure a first time-frequency resource. The first time-frequency resource is a resource for transmitting an SRS. In the first time-frequency resource, a time domain resource includes an index of an OFDM symbol occupied by the SRS, and a frequency domain resource includes an index of a PRB occupied by the SRS.

In one embodiment, the downlink configuration instruction is further used to configure a sequence resource required for generating the SRS, or the sequence resource and a code resource. The sequence resource is a base sequence number of a Zadoff-Chu sequence. The code resource is a cyclic shift number for the Zadoff-Chu sequence, and/or the code resource is an index of an orthogonal spreading code for the Zadoff-Chu sequence.

In one embodiment, the downlink configuration instruction is further used to configure a second time-frequency resource. The second time-frequency resource is a resource for transmitting first channel quality information. A time domain resource includes an index of an OFDM symbol occupied by the first channel quality information, and a frequency domain resource includes an index of a PRB occupied by the first channel quality information.

In one embodiment, the downlink configuration instruction further includes signaling for triggering the terminal to report the first channel quality information.

In one embodiment, the downlink configuration instruction is dynamic information, or UE-specific signaling, or UE group-specific signaling.

In operation 502, the terminal receives the downlink configuration instruction sent by the access network device.

The terminal obtains the reference signal resource from the downlink configuration instruction.

In one embodiment, the terminal further obtains a time-frequency resource for transmitting the SRS from the downlink configuration instruction.

In one embodiment, the terminal further obtains, from the downlink configuration instruction, the sequence resource required for generating the SRS, or the sequence resource and the code resource.

In operation 503, the access network device sends a downlink reference signal to the terminal by using a reference signal resource.

In one embodiment, the CSI-RS is a non-zero-power CSI-RS. The access network device sends the CSI-RS to the terminal on the reference signal resource based on first transmit power.

In operation 504, the terminal performs measurement on the reference signal resource to obtain first signal quality information.

In one embodiment, the first signal quality information carries received signal information.

The terminal performs measurement on the reference signal resource to obtain the received signal information. In one embodiment, the reference signal resource corresponds to a plurality of reference signal ports. The received signal information is represented in a form of information about a received signal that is on each reference signal port and that is obtained by the terminal through measurement on each receive antenna, that is, a received signal matrix.

Assuming that the received signal matrix of the CSI-RS is YN*M, dimensions of YN*M are N rows by M columns, N is a receive antenna quantity of the terminal, and M is a transmit antenna quantity of the access network device:

$$YN*M=HS+I, \text{ where}$$

H is a downlink channel of the access network device to the terminal, S is information about a signal sent by the access network device to the terminal, and I is interference information. In one embodiment, S is indicated by using a signal whose power is normalized to 1.

In one embodiment, the terminal uses the received signal matrix YN*M as the received signal information.

In operation 505, the terminal sends an SRS to the access network device.

In one embodiment, the terminal generates an SRS based on a sequence resource configured in downlink configuration signaling.

In one embodiment, the terminal generates an SRS based on a sequence resource and a code resource that are configured in downlink configuration signaling.

In one embodiment, the terminal sends the SRS to the access network device by using a time-frequency resource configured in downlink configuration information.

In one embodiment, the terminal sends the SRS to the access network device based on second transmit power.

In operation 506, the access network device receives the SRS sent by the terminal.

The access network device receives, based on the time-frequency resource configured by using the downlink configuration instruction, the SRS sent by the terminal.

In operation 507, the terminal generates first channel quality information carrying received signal information, where the first channel quality information carries the received signal information.

In one embodiment, the first channel quality information is indicated by using CSI. The CSI carries the received signal information.

In one embodiment, the received signal information is a received signal matrix YN*M. The received signal matrix YN*M represents information about a received signal that is on each reference signal port and that is obtained by the terminal through measurement on each receive antenna. The received signal information may be considered as combined information of signal information HS and interference information I.

In one embodiment, the first channel quality information further includes transmit power information when the terminal sends the SRS. The transmit power information is indicated by using any one of absolute transmit power (that is, the second transmit power), a closed-loop power control parameter, and power headroom information. The power headroom (Power Headroom) information is maximum transmit power of the terminal minus the second transmit power. The maximum transmit power of the terminal is maximum transmit power that is of the terminal and that is configured by the access network device but is not actual maximum transmit power of the terminal.

In operation 508, the terminal sends the first channel quality information to the access network device.

In one embodiment, the terminal sends the first channel quality information, namely, the CSI, to the access network device based on the second time-frequency resource configured by using the downlink configuration instruction.

In operation 509, the access network device receives the first channel quality information sent by the terminal.

In one embodiment, the access network device receives, based on the second time-frequency resource configured by using the downlink configuration instruction, the first channel quality information, namely, the CSI, sent by the terminal.

In operation 510, the access network device performs calculation based on the first channel quality information and the SRS to obtain second channel quality information.

In one embodiment, the second channel quality information is an SNR of the downlink channel.

In one embodiment, this operations includes the following operations.

1. The access network device performs calculation based on the SRS to obtain channel estimation information H_U of an uplink channel.

2. The access network device calculates a power ratio γ based on the first transmit power of the CSI-RS and the second transmit power of the SRS.

3. The access network device performs power scaling on a channel estimation matrix H_U of the uplink channel, to obtain channel estimation information of a downlink channel, to be specific, H_D=H_U*γ.

4. The access network device obtains received signal information YN*M from the first channel quality information.

5. The access network device performs calculation to obtain the interference information I.

The access network device performs calculation based on the following formula to obtain the interference information I:

$$I = YN*M - H\_D*S, \text{ where}$$

YN*M is received signal information, H_D is the channel estimation information of the downlink channel, and S is the information about the signal sent by the access network device in the CSI-RS.

6. The access network device performs calculation based on the interference information I and the channel estimation information H_D to obtain the SNR of the downlink channel.

The access network device uses the SNR of the downlink channel as the second channel quality information. The second channel quality information is used to represent channel quality of the downlink channel.

In conclusion, according to the channel quality information calculation method provided in this embodiment, the terminal sends the first channel quality information to the access network device, where the first channel quality information is the received signal information obtained by the terminal through measurement on the downlink channel, and the received signal information is the combined information of the interference information and the signal information. Because the first channel quality information can more accurately represent an interference status of the downlink channel, the prior-art problem that the channel quality information that is of the downlink channel and that is obtained through calculation by the eNB is inaccurate is resolved. In this way, the access network device performs calculation based on the first channel quality information and the SRS to obtain the second channel quality information, and the second channel quality information can accurately represent the channel quality of the downlink channel.

In an optional embodiment based on FIG. 5, the received signal information may be represented in another form.

In one embodiment, the received signal information includes elements of a covariance matrix of a received signal that is on each reference signal port and that is measured on each receive antenna. In other words, the received signal information includes the covariance matrix of the received signal.

A covariance matrix R(Y) is solved for the received signal matrix YN*M, to obtain:

$$R(Y) = E(Y*Y^H) = \begin{bmatrix} r^y_{00} & r^y_{01} & \Lambda & r^y_{0N-1} \\ r^y_{10} & M & M & M \\ M & M & M & M \\ r^y_{N-10} & \Lambda & \Lambda & r^y_{N-1N-1} \end{bmatrix} =$$

$$E\left(\begin{bmatrix} y_{00} & y_{01} & \Lambda & y_{0M-1} \\ y_{10} & M & M & M \\ M & M & M & M \\ y_{N-1N-1} & \Lambda & \Lambda & y_{N-1M-1} \end{bmatrix} * \begin{bmatrix} y_{00} & y_{01} & \Lambda & y_{0M-1} \\ y_{10} & M & M & M \\ M & M & M & M \\ y_{N-1N-1} & \Lambda & \Lambda & y_{N-1M-1} \end{bmatrix}^H\right)$$

Y is a received signal matrix, and YH is a conjugate transpose matrix of the received signal matrix. Dimensions of the covariance matrix R(Y) are N rows by N columns, and N is a receive antenna quantity of the terminal.

In this case, suboperations included in the foregoing operation 510 are alternatively implemented as follows:

1. The access network device performs calculation based on the SRS to obtain channel estimation information H_U of an uplink channel.

2. The access network device calculates a power ratio γ based on the first transmit power of the CSI-RS and the second transmit power of the SRS.

3. The access network device performs power scaling on a channel estimation matrix H_U of the uplink channel, to obtain channel estimation information of a downlink channel, to be specific, H_D=H_U*γ.

4. The access network device calculates a covariance matrix R(H) of the channel estimation information H_D of the downlink channel, where $R(H)=E(H*H^H)$ H is a matrix of the channel estimation information H_D, and HH is a conjugate transpose matrix of H.

5. The access network device obtains the covariance matrix R(Y) from the first channel quality information.

6. The access network device performs calculation to obtain the interference information I.

The access network device performs calculation based on the following formula to obtain a covariance matrix R(I) of the interference information I:

$$R(I)=R(Y)-R(H).$$

7. The access network device performs calculation based on the covariance matrix R(I) of the interference information and the channel estimation information R(H) of the downlink channel to obtain an SNR of the downlink channel.

In an optional embodiment based on FIG. 5, to reduce a data volume when the terminal feeds back the covariance matrix R(Y) to the access network device, the terminal feeds back only some elements in the covariance matrix R(Y) to the access network device. In this case, the received signal information includes any one of five types of information shown as follows:

a first type: main diagonal elements of the covariance matrix of the received signal, where the main diagonal elements are matrix elements located on a diagonal line from the upper left to the lower right of the covariance matrix;

a second type: one of the main diagonal elements of the covariance matrix of the received signal;

a third type: an average value of the main diagonal elements of the covariance matrix of the received signal;

a fourth type: one of the main diagonal elements of the covariance matrix of the received signal, and differential values of other main diagonal elements relative to the main diagonal element; or a fifth type: the average value of the main diagonal elements of the covariance matrix of the received signal, and differential values of the main diagonal elements relative to the average value.

For the first type of information, after receiving main diagonal elements of the covariance matrix R(Y), the access network device sets a non-main diagonal element in the covariance matrix R(Y) to 0.

For the second type of information, after receiving one of the main diagonal elements of the covariance matrix R(Y), the access network device sets all other main diagonal elements in the covariance matrix R(Y) to the received main diagonal element, and sets each non-main diagonal element in the covariance matrix R(Y) to 0.

For the third type of information, after receiving an average value of the main diagonal elements of the covariance matrix R(Y), the access network device sets all the main diagonal elements in the covariance matrix R(Y) to the received average value, and sets each non-main diagonal element in the covariance matrix R(Y) to 0.

For the fourth type of information, after receiving one of the main diagonal elements of the covariance matrix R(Y) and differential values of other main diagonal elements relative to the main diagonal element, the access network device restores the other main diagonal elements of the covariance matrix R(Y) based on the known main diagonal element and the differential values; and sets each non-main diagonal element in the covariance matrix R(Y) to 0.

For the fifth type of information, after receiving the average value of the main diagonal elements of the covariance matrix R(Y) and differential values of the main diagonal elements relative to the average value, the access network device restores the main diagonal elements of the covariance matrix R(Y) based on the known average value and differential values; and sets each non-main diagonal element in the covariance matrix R(Y) to 0.

In conclusion, the terminal feeds back only some matrix elements in the covariance matrix to the access network device, so that a data volume when the terminal feeds back the first channel quality information can be reduced, thereby reducing transmission resources required for the first channel quality information.

In another optional embodiment based on FIG. 5, to reduce the data volume when the terminal feeds back the received signal information to the access network device, reference signal received power (RSRP) is further used to quantize the received signal information. To be specific, the terminal uses a ratio of the received signal information to the RSRP as the first channel quality information.

Specifically, when the received signal information is indicated by using the received signal matrix, the covariance matrix, or some matrix elements of the covariance matrix, a ratio of each matrix element in the received signal information to the RSRP is used as the first channel quality information, or a ratio of the RSRP to each matrix element in the received signal information is used as the first channel quality information.

The RSRP is RSRP latest reported by the terminal. Alternatively, the RSRP is latest reported RSRP, and the RSRP and a downlink reference signal transmitted on the reference signal resource have a same beam index.

In one embodiment, the ratio of the received signal information to the RSRP is quantized, to obtain the first channel quality information. For example, the received signal information is indicated by using the received signal matrix, and the ratio of each matrix element in the received signal matrix to the RSRP is quantized by using a quantization interval in the following Table 1, to obtain a corresponding quantization bit.

TABLE 1

| First channel quality information | Quantization interval [dBm] |
|---|---|
| 0 | [−138, −126] |
| 1 | [−126, −114] |
| 2 | [−114, −102] |
| 3 | [−102, −90] |
| 4 | [−90, −78] |
| 5 | [−78, −66] |
| 6 | [−66, −54] |
| 7 | [−54, −42] |

For example, if a ratio of a matrix element to the RSRP corresponds to −120 dBm, the quantization bit is 0. When there are ratios of a plurality of matrix elements to the RSRP, the quantization process is separately performed.

In one embodiment, the received signal matrix may be alternatively quantized by using the quantization interval in Table 1, to obtain the first channel quality information.

In conclusion, quantization of the received signal information by using the RSRP can limit a range of each matrix element to a relatively small range, so that the quantization interval is smaller, and a quantity of bits eventually obtained through quantization is smaller, thereby reducing a data amount when the terminal feeds back the first channel quality information, and reducing transmission resources required for the first channel quality information.

FIG. 6 is a flowchart of a channel quality information calculation method according to another embodiment of this application. In this embodiment, that the channel quality information calculation method is applied to the channel quality information calculation system shown in FIG. 1 is used as an example for description. The method includes the following operations.

In operation 601, an access network device sends a downlink configuration instruction to a terminal.

In one embodiment, the downlink configuration instruction is used to configure a reference signal resource. The reference signal resource is a time-frequency resource occupied by an NZP CSI-RS. A time domain resource includes an index of an OFDM symbol occupied by a CSI-RS. A frequency domain resource occupied by the CSI-RS includes an index of a PRB. The NZP CSI-RS is briefly referred to as a CSI-RS below.

In one embodiment, the downlink configuration instruction is further used to configure a first time-frequency resource. The first time-frequency resource is a resource for transmitting an SRS. In the first time-frequency resource, a time domain resource includes an index of an OFDM symbol occupied by the SRS, and a frequency domain resource includes an index of a PRB occupied by the SRS.

In one embodiment, the downlink configuration instruction is further used to configure a sequence resource required for generating the SRS, or the sequence resource and a code resource. The sequence resource is a base sequence number of a Zadoff-Chu sequence. The code resource is a cyclic shift number for the Zadoff-Chu sequence, and/or the code resource is an index of an orthogonal spreading code for the Zadoff-Chu sequence.

In one embodiment, the downlink configuration instruction is further used to configure a second time-frequency resource. The second time-frequency resource is a resource for transmitting first channel quality information. A time domain resource includes an index of an OFDM symbol occupied by the first channel quality information, and a frequency domain resource includes an index of a PRB occupied by the first channel quality information.

In one embodiment, the downlink configuration instruction further includes signaling for triggering the terminal to report the first channel quality information.

In one embodiment, the downlink configuration instruction is dynamic information, or UE-specific signaling, or UE group (group)-specific signaling.

In operation 602, the terminal receives the downlink configuration instruction sent by the access network device.

The terminal obtains the reference signal resource from the downlink configuration instruction.

In one embodiment, the terminal further obtains a time-frequency resource for transmitting the SRS from the downlink configuration instruction.

In one embodiment, the terminal further obtains, from the downlink configuration instruction, the sequence resource required for generating the SRS, or the sequence resource and the code resource.

In operation 603, the access network device sends a downlink reference signal to the terminal by using a reference signal resource.

In one embodiment, the CSI-RS is a non-zero-power CSI-RS. The access network device sends the CSI-RS to the terminal on the reference signal resource based on first transmit power.

In operation 604, the terminal performs measurement on the reference signal resource to obtain first signal quality information, where the first signal quality information carries interference information.

In one embodiment, the first signal quality information carries the interference information.

In one embodiment, this operations includes the following subopertions.

1. The terminal performs measurement on the reference signal resource to obtain received signal information. In one embodiment, the reference signal resource corresponds to a plurality of reference signal ports. The received signal information is represented in a form of information about a received signal that is on each reference signal port and that is obtained by the terminal through measurement on each receive antenna, that is, a received signal matrix.

Assuming that the received signal matrix of the CSI-RS is $Y_{N*M}$, dimensions of $Y_{N*M}$ are N rows by M columns, N is a receive antenna quantity of the terminal, and M is a transmit antenna quantity of the access network device:

$$Y=HS+I, \text{ where}$$

H is a downlink channel of the access network device to the terminal, S is information about a signal sent by the access network device to the terminal, and I is interference information.

2. The terminal performs calculation based on a preset channel estimation algorithm, to obtain channel estimation information of a downlink channel.

The terminal performs channel estimation on the CSI-RS based on the predetermined channel estimation algorithm, and performs calculation to obtain a channel estimation matrix H_D of the downlink channel. The predetermined channel estimation algorithm includes but is not limited to at least one of least-square (Least-Square) channel estimation, minimum mean square error (Minimum Mean Square Error, MMSE) channel estimation, and Wiener channel estimation.

3. The terminal obtains the interference information I by using the following formula:

$$I=Y-H\_D*S.$$

In one embodiment, the interference information I is an interference signal matrix $I_{N*M}$, dimensions of the interference signal matrix $I_{N*M}$ are N rows by M columns, N is a receive antenna quantity of the terminal, and M is a transmit antenna quantity of the access network device.

In operation 605, the terminal sends an SRS to the access network device.

In one embodiment, the terminal generates an SRS based on a sequence resource configured in downlink configuration signaling.

In one embodiment, the terminal generates an SRS based on a sequence resource and a code resource that are configured in downlink configuration signaling.

In one embodiment, the terminal sends the SRS to the access network device by using a time-frequency resource configured in downlink configuration information.

In one embodiment, the terminal sends the SRS to the access network device based on second transmit power.

In operation 606, the access network device receives the SRS sent by the terminal.

The access network device receives, based on the time-frequency resource configured by using the downlink configuration instruction, the SRS sent by the terminal.

In operation 607, the terminal generates first channel quality information carrying interference information.

In one embodiment, the first channel quality information is indicated by using CSI. The CSI carries the interference information.

In one embodiment, the interference information I is an interference signal matrix IN*M. The interference signal matrix IN*M represents information about an interference signal that is on each reference signal port and that is obtained by the terminal through measurement on each receive antenna.

In one embodiment, the first channel quality information further includes transmit power information when the terminal sends the SRS. The transmit power information is indicated by using any one of absolute transmit power (that is, the second transmit power), a closed-loop power control parameter, and power headroom information. The power headroom (Power Headroom) information is maximum transmit power of the terminal minus the second transmit power. The maximum transmit power of the terminal is maximum transmit power that is of the terminal and that is configured by the access network device but is not actual maximum transmit power of the terminal.

In operation 608, the terminal sends the first channel quality information to the access network device.

In one embodiment, the terminal sends the first channel quality information, namely, the CSI, to the access network device based on the second time-frequency resource configured by using the downlink configuration instruction.

In operation 609, the access network device receives the first channel quality information sent by the terminal.

In one embodiment, the access network device receives, based on the second time-frequency resource configured by using the downlink configuration instruction, the first channel quality information, namely, the CSI, sent by the terminal.

In operation 610, the access network device performs calculation based on the first channel quality information and the SRS to obtain second channel quality information.

In one embodiment, the second channel quality information is a signal-to-noise ratio (SNR) of the downlink channel.

In one embodiment, this step includes the following operations.

1. The access network device performs calculation based on the SRS to obtain channel estimation information H_U of an uplink channel.

2. The access network device calculates a power ratio γ based on the first transmit power of the CSI-RS and the second transmit power of the SRS.

3. The access network device performs power scaling on a channel estimation matrix H_U of the uplink channel, to obtain channel estimation information of a downlink channel, to be specific, H_D=H_U*γ.

4. The access network device obtains interference information YN*M from the first channel quality information.

5. The access network device performs calculation based on the interference information I and the channel estimation information H_D to obtain the SNR of the downlink channel.

The access network device uses the SNR of the downlink channel as the second channel quality information. The second channel quality information is used to represent channel quality of the downlink channel.

In conclusion, according to the channel quality information calculation method provided in this embodiment, the terminal sends the first channel quality information to the access network device, where the first channel quality information is the interference information obtained by the terminal through measurement on the downlink channel. Because the first channel quality information can more accurately represent an interference status of the downlink channel, the prior-art problem that the channel quality information that is of the downlink channel and that is obtained through calculation by the eNB is inaccurate is resolved. In this way, the access network device performs calculation based on the first channel quality information and the SRS to obtain the second channel quality information, and the second channel quality information can accurately represent channel quality of the downlink channel.

In addition, because the first channel quality information fed back by the terminal to the access network device carries the interference information, a calculation amount of the access network device when calculating the second channel quality information is relatively small, so that calculation load of the access network device can be reduced.

FIG. 7 is a flowchart of a channel quality information calculation method according to another embodiment of this application. In this embodiment, that the channel quality information calculation method is applied to the channel quality information calculation system shown in FIG. 1 is used as an example for description. The method includes the following operations.

In operation 701, an access network device sends a downlink configuration instruction to a terminal.

In one embodiment, the downlink configuration instruction is used to configure a reference signal resource. The reference signal resource is a time-frequency resource occupied by an NZP CSI-RS. A time domain resource includes an index of an OFDM symbol occupied by a CSI-RS. A frequency domain resource occupied by the CSI-RS includes an index of a PRB. The NZP CSI-RS is briefly referred to as a CSI-RS below.

In one embodiment, the downlink configuration instruction is further used to configure a first time-frequency resource. The first time-frequency resource is a resource for transmitting an SRS. In the first time-frequency resource, a time domain resource includes an index of an OFDM symbol occupied by the SRS, and a frequency domain resource includes an index of a PRB occupied by the SRS.

In one embodiment, the downlink configuration instruction is further used to configure a sequence resource required for generating the SRS, or the sequence resource and a code resource. The sequence resource is a base sequence number of a Zadoff-Chu sequence. The code resource is a cyclic shift number for the Zadoff-Chu sequence, and/or the code resource is an index of an orthogonal spreading code for the Zadoff-Chu sequence.

In one embodiment, the downlink configuration instruction is further used to configure a second time-frequency resource. The second time-frequency resource is a resource for transmitting first channel quality information. A time domain resource includes an index of an OFDM symbol occupied by the first channel quality information, and a frequency domain resource includes an index of a PRB occupied by the first channel quality information.

In one embodiment, the downlink configuration instruction further includes signaling for triggering the terminal to report the first channel quality information.

In one embodiment, the downlink configuration instruction is dynamic information, or UE-specific signaling, or UE group (group)-specific signaling.

In operation 702, the terminal receives the downlink configuration instruction sent by the access network device.

The terminal obtains the reference signal resource from the downlink configuration instruction.

In one embodiment, the terminal further obtains a time-frequency resource for transmitting the SRS from the downlink configuration instruction.

In one embodiment, the terminal further obtains, from the downlink configuration instruction, the sequence resource required for generating the SRS, or the sequence resource and the code resource.

In operation 703, another access network device sends a downlink reference signal to the terminal by using a reference signal resource.

In one embodiment, the CSI-RS is a zero-power CSI-RS. The CSI-RS is a CSI-RS sent by the another access network device to the terminal on the reference signal resource based on first transmit power.

In operation 704, the terminal performs measurement on the reference signal resource to obtain first signal quality information, where the first signal quality information carries interference information.

Because all zero-power CSI-RSs are interference signals caused by other access network devices, the terminal directly performs measurement on the reference signal resource to obtain the interference information. In one embodiment, the reference signal resource corresponds to a plurality of reference signal ports, and the interference information is represented in a form of information about an interference signal that is on each reference signal port and that is obtained by the terminal through measurement on each receive antenna, that is, an interference signal matrix IN*M.

N is a receive antenna quantity of the terminal, and M is a transmit antenna quantity of the access network device.

In one embodiment, the first signal quality information carries the interference information.

In operation 705, the terminal sends an SRS to the access network device.

In one embodiment, the terminal generates an SRS based on a sequence resource configured in downlink configuration signaling.

In one embodiment, the terminal generates an SRS based on a sequence resource and a code resource that are configured in downlink configuration signaling.

In one embodiment, the terminal sends the SRS to the access network device by using a time-frequency resource configured in downlink configuration information.

In one embodiment, the terminal sends the SRS to the access network device based on second transmit power.

In operation 706, the access network device receives the SRS sent by the terminal.

The access network device receives, based on the time-frequency resource configured by using the downlink configuration instruction, the SRS sent by the terminal.

In operation 707, the terminal generates first channel quality information carrying interference information.

In one embodiment, the first channel quality information is indicated by using CSI. The CSI carries the interference information.

In one embodiment, the interference information I is an interference signal matrix IN*M. The interference signal matrix IN*M represents information about an interference signal that is on each reference signal port and that is obtained by the terminal through measurement on each receive antenna.

In one embodiment, the first channel quality information further includes transmit power information when the terminal sends the SRS. The transmit power information is indicated by using any one of absolute transmit power (that is, the second transmit power), a closed-loop power control parameter, and power headroom information. The power headroom (Power Headroom) information is maximum transmit power of the terminal minus the second transmit power. The maximum transmit power of the terminal is maximum transmit power that is of the terminal and that is configured by the access network device but is not actual maximum transmit power of the terminal.

In operation 708, the terminal sends the first channel quality information to the access network device.

In one embodiment, the terminal sends the first channel quality information, namely, the CSI, to the access network device based on the second time-frequency resource configured by using the downlink configuration instruction.

In operation 709, the access network device receives the first channel quality information sent by the terminal.

In one embodiment, the access network device receives, based on the second time-frequency resource configured by using the downlink configuration instruction, the first channel quality information, namely, the CSI, sent by the terminal.

In operation 710, the access network device performs calculation based on the first channel quality information and the SRS to obtain second channel quality information.

In one embodiment, the second channel quality information is a signal-to-noise ratio (SNR) of the downlink channel.

In one embodiment, this step includes the following operations.

1. The access network device performs calculation based on the SRS to obtain channel estimation information H_U of an uplink channel.

2. The access network device calculates a power ratio γ based on the first transmit power of the CSI-RS and the second transmit power of the SRS.

Because the CSI-RS is a CSI-RS sent by another access network device, the first transmit power may be equivalently replaced by the access network device by using other transmit power. For example, the access network device uses, as the first transmit power, transmit power of the access network device when the access network device sends data to the terminal.

3. The access network device performs power scaling on a channel estimation matrix H_U of the uplink channel, to obtain channel estimation information of a downlink channel, to be specific, H_D=H_U*γ.

4. The access network device obtains interference information YN*M from the first channel quality information.

5. The access network device performs calculation based on the interference information I and the channel estimation information H_D to obtain the SNR of the downlink channel.

The access network device uses the SNR of the downlink channel as the second channel quality information. The second channel quality information is used to represent channel quality of the downlink channel.

In conclusion, according to the channel quality information calculation method provided in this embodiment, the terminal sends the first channel quality information to the access network device, where the first channel quality information is the interference information obtained by the terminal through measurement on the downlink channel. Because the first channel quality information can more accurately represent an interference status of the downlink channel, the prior-art problem that the channel quality information that is of the downlink channel and that is obtained through calculation by the eNB is inaccurate is resolved. In this way, the access network device performs calculation based on the first channel quality information and the SRS to obtain the second channel quality information, and the second channel quality information can accurately represent channel quality of the downlink channel.

In addition, because the access network device does not need to send a CSI-RS for a zero-power CSI-RS, transmit resources that the access network device needs to consume are reduced, and a calculation amount of the terminal can be reduced, so that calculation load of the terminal is reduced.

In an optional embodiment based on FIG. 6 or FIG. 7, the interference information may be represented in another form.

In one embodiment, the interference information includes elements of a covariance matrix of an interference signal that is on each reference signal port and that is measured on each receive antenna. In other words, the interference information includes the covariance matrix of the interference signal.

A covariance matrix R(I) is solved for the interference signal matrix IN*M, to obtain:

$$R(I) = E(I * I^H) = \begin{bmatrix} r_{00}^y & r_{01}^y & \Lambda & r_{0N-1}^y \\ r_{10}^y & M & M & M \\ M & M & M & M \\ r_{N-10}^y & \Lambda & \Lambda & r_{N-1N-1}^y \end{bmatrix} =$$

$$E\left(\begin{bmatrix} i_{00} & i_{01} & \Lambda & i_{0M-1} \\ i_{10} & M & M & M \\ M & M & M & M \\ i_{N-1N-1} & \Lambda & \Lambda & i_{N-1M-1} \end{bmatrix} * \begin{bmatrix} i_{00} & i_{01} & \Lambda & i_{0M-1} \\ i_{10} & M & M & M \\ M & M & M & M \\ i_{N-1N-1} & \Lambda & \Lambda & i_{N-1M-1} \end{bmatrix}^H\right)$$

where I is an interference signal matrix, and IH is a conjugate transpose matrix of the interference signal matrix I. Dimensions of the covariance matrix R(I) are N rows by N columns, and N is a receive antenna quantity of the terminal.

In this case, suboperations included in the foregoing operation 610 or operation 710 are alternatively implemented as follows:

1. The access network device performs calculation based on the SRS to obtain channel estimation information H_U of an uplink channel.

2. The access network device calculates a power ratio γ based on the first transmit power of the CSI-RS and the second transmit power of the SRS.

3. The access network device performs power scaling on a channel estimation matrix H_U of the uplink channel, to obtain channel estimation information of a downlink channel, to be specific, H_D=H_U*γ.

4. The access network device calculates a covariance matrix R(H) of the channel estimation information H_D of the downlink channel, where H is a matrix of the channel estimation information H_D, and HH is a conjugate transpose matrix of H.

5. The access network device obtains the covariance matrix R(I) from the first channel quality information.

6. The access network device performs calculation based on the covariance matrix R(I) of the interference information and the channel estimation information R(H) of the downlink channel to obtain an SNR of the downlink channel.

In an optional embodiment based on FIG. 6 or FIG. 7, to reduce a data volume when the terminal feeds back the covariance matrix R(I) to the access network device, the terminal feeds back only some elements in the covariance matrix R (I) to the access network device. In this case, the interference information includes any one of five types of information shown as follows:

a first type: main diagonal elements of the covariance matrix of the interference signal, where the main diagonal elements are matrix elements located on a diagonal line from the upper left to the lower right of the covariance matrix;

a second type: one of the main diagonal elements of the covariance matrix of the interference signal;

a third type: an average value of the main diagonal elements of the covariance matrix of the interference signal;

a fourth type: one of the main diagonal elements of the covariance matrix of the interference signal, and differential values of other main diagonal elements relative to the main diagonal element; or a fifth type: the average value of the main diagonal elements of the covariance matrix of the interference signal, and differential values of the main diagonal elements relative to the average value.

For the first type of information, after receiving main diagonal elements of the covariance matrix R(I), the access network device sets a non-main diagonal element in the covariance matrix R(I) to 0.

For the second type of information, after receiving one of the main diagonal elements of the covariance matrix R(I), the access network device sets all other main diagonal elements in the covariance matrix R(I) to the received main diagonal element, and sets each non-main diagonal element in the covariance matrix R(I) to 0.

For the third type of information, after receiving the average value of the main diagonal elements of the covariance matrix R(I), the access network device sets all the main diagonal elements in the covariance matrix R(I) to the received average value, and sets each non-main diagonal element in the covariance matrix R(I) to 0.

For the fourth type of information, after receiving one of the main diagonal elements of the covariance matrix R(I) and differential values of other main diagonal elements relative to the main diagonal element, the access network device restores the other main diagonal elements of the covariance matrix R(I) based on the known main diagonal element and the differential values; and sets each non-main diagonal element in the covariance matrix R(I) to 0.

For the fifth type of information, after receiving the average value of the main diagonal elements of the covariance matrix R(I) and differential values of the main diagonal elements relative to the average value, the access network device restores the main diagonal elements of the covariance matrix R(I) based on the known average value and differential values; and sets each non-main diagonal element in the covariance matrix R(I) to 0.

In conclusion, the terminal feeds back only some matrix elements in the covariance matrix to the access network device, so that a data volume when the terminal feeds back the first channel quality information can be reduced, thereby reducing transmission resources required for the first channel quality information.

In another optional embodiment based on FIG. 6 or FIG. 7, to reduce the data volume when the terminal feeds back the interference information to the access network device, reference signal received power (Reference Signal Received Power, RSRP for short) is further used to quantize the interference information. To be specific, the terminal uses a ratio of the interference information to the RSRP as the first channel quality information.

Specifically, when the interference information is indicated by using the interference signal matrix, the covariance matrix, or some matrix elements of the covariance matrix, a ratio of each matrix element in the interference information to the RDRP is used as the first channel quality information, or a ratio of the RSRP to each matrix element in the interference information is used as the first channel quality information.

The RSRP is RSRP latest reported by the terminal. Alternatively, the RSRP is latest reported RSRP, and the RSRP and a downlink reference signal transmitted on the reference signal resource have a same beam index.

In one embodiment, the ratio of the interference information to the RSRP is quantized, to obtain the first channel quality information. For example, the interference information is indicated by using an interference information matrix, and the ratio of each matrix element in the interference information matrix to the RSRP is quantized by using a quantization interval in the foregoing Table 1, to obtain a corresponding quantization bit. For example, if a ratio of a matrix element to the RSRP corresponds to −120 dBm, the quantization bit is 0. When there are ratios of a plurality of matrix elements to the RSRP, the quantization process is separately performed.

In one embodiment, the interference signal matrix may be alternatively quantized by using the quantization interval in Table 1, to obtain the first channel quality information.

In conclusion, quantization of the interference information by using the RSRP can limit a range of each matrix element to a relatively small range, so that the quantization interval is smaller, and a quantity of bits eventually obtained through quantization is smaller, thereby reducing a data amount when the terminal feeds back the first channel quality information, and reducing transmission resources required for the first channel quality information.

In an optional embodiment based on FIG. 5, FIG. 6, or FIG. 7, when the access network device calculates the second channel quality information based on the interference information and the channel estimation information of the downlink channel, the access network device calculates the second channel quality information based on a predetermined formula.

For example, a receiver type of the terminal is an MMSE, and the access network device calculates the second channel quality information based on the following formula:

$$\beta_i = h_i^H (HH^H + E_s^{-1} R)^{-1} h_i$$

$$\gamma_i = E_s \frac{\beta_i}{1 - \beta_i}$$

where H is a channel estimation matrix of the downlink channel, HH is a conjugate transpose matrix of H, Es is transmit signal power, where it is usually assumed that Es is 1, hi is a channel estimation vector corresponding to an $i^{th}$ layer of data, hi is an $i^{th}$ column of data in H, and is an SNR of the $i^{th}$ layer of data.

In one embodiment, because there are many receiver types of the terminal, the terminal further adds the receiver type or the receiver processing gain to the first channel quality information, to more accurately calculate an SNR of the downlink channel, and the access network device selects, based on the receiver type or the receiver processing gain, a proper calculation formula to calculate the second channel quality information.

It should be noted that in an optional embodiment based on FIG. 5, FIG. 6, or FIG. 7, time domain resources configured by using the downlink configuration instruction are divided based on a symbol granularity.

In one embodiment, the downlink configuration instruction is used to configure an OFDM symbol position and/or a PRB position corresponding to the reference signal resource. The OFDM symbol position includes: an index of a start symbol occupied by the reference signal resource and a total quantity of symbols occupied by the reference signal resource, or the index of a start symbol and an index of an end symbol occupied by the reference signal resource. The PRB position includes indexes of PRBs in all transmission bandwidths occupied by the reference signal resource, where the plurality of PRBs are non-contiguous PRBs or contiguous PRBs.

In one embodiment, the downlink configuration instruction is used to configure an OFDM symbol position and/or a PRB position corresponding to the first time-frequency resource, The OFDM symbol position includes: an index of a start symbol occupied by the reference signal resource and a total quantity of symbols occupied by the reference signal resource, or the index of a start symbol and an index of an end symbol occupied by the reference signal resource. The PRB position includes indexes of PRBs in all transmission bandwidths occupied by the SRS, where the SRS is transmitted in the transmission bandwidth through frequency hopping, and the plurality of PRBs are non-contiguous PRBs or contiguous PRBs, where the transmission bandwidths occupied by the SRS in each OFDM symbol are the same or different.

Figure 8:
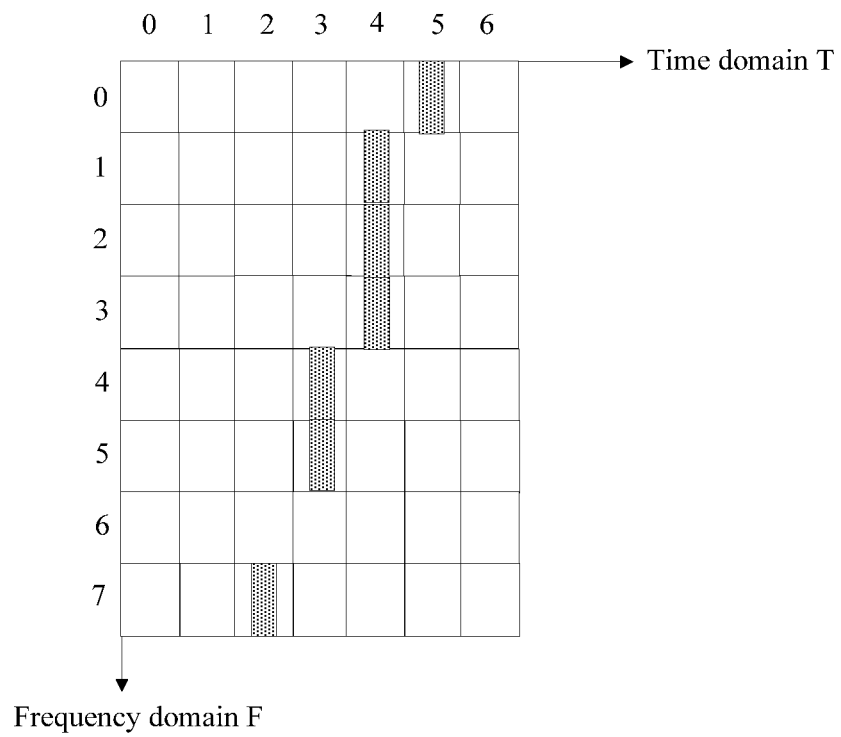
FIG. 8 is a schematic diagram of resources occupied by an SRS in a time domain unit according to an embodiment of this application.

It should be noted that PRBs within the transmission bandwidths occupied by the SRS in each OFDM symbol are flexibly configured. For example, as shown in FIG. 8, the SRS occupies a second OFDM symbol, a third OFDM symbol, a fourth OFDM symbol, and a fifth OFDM symbol in time domain T. In the second OFDM symbol, the SRS occupies a PRB 7 in frequency domain F. In the third OFDM symbol, the SRS occupies a PRB 4 and a PRB 5 in frequency domain. In the fourth OFDM symbol, the SRS occupies a PRB 1, a PRB 2, and a PRB 3 in frequency domain. In the fifth symbol, the SRS occupies a PRB 0 in frequency domain.

In one embodiment, the downlink configuration instruction is used to configure an OFDM symbol position and/or a PRB position corresponding to the second time-frequency resource. The OFDM symbol position includes: an index of a start symbol occupied by the first channel quality information and a total quantity of symbols occupied by the first channel quality information, or the index of a start symbol and an index of an end symbol occupied by the first channel quality information. The PRB position includes indexes of PRBs in all transmission bandwidths occupied by the first channel quality information, where the plurality of PRBs are non-contiguous PRBs or contiguous PRBs.

It should be noted that in the foregoing embodiments or the foregoing optional embodiments, the terminal needs to send two types of information, namely, the first channel quality information and the SRS, to the access network device. A sequence of sending the first channel quality information and the SRS is not limited in this embodiment of this application. In one embodiment, the first channel quality information is sent before the SRS, or the SRS is sent before the first channel quality information, or the SRS and the first channel quality information are alternately sent, or the SRS and the first channel quality information are sent at the same time.

In one embodiment, a time domain resource occupied by the reference signal resource, a time domain resource occupied by the SRS, and a time domain resource occupied by the first channel quality information belong to a same time domain unit.

In one embodiment, a time domain resource occupied by the downlink configuration instruction, a time domain resource occupied by the reference signal resource, a time domain resource occupied by the SRS, and a time domain resource occupied by the first channel quality information belong to a same time domain unit.

In other words, the access network device can rapidly and accurately learn of the SNR of the downlink channel of the terminal within one time domain unit.

The following elaborates a sending sequence between the foregoing information or reference signals by using an example in which one time domain unit is used, the reference signal resource is a time-frequency resource occupied by the CSI-RS, the first time-frequency resource is a time-frequency resource occupied by the SRS, and the second time-frequency resource is a time-frequency resource occupied by the CSI. In this embodiment of this application, the time domain unit is a timeslot (slot), a subframe (subframe), or a transmission time interval (Transmission Time Interval, TTI). Usually, a timeslot includes seven OFDM symbols, a subframe includes 14 OFDM symbols, and a TTI includes 14 OFDM symbols.

Figure 9:
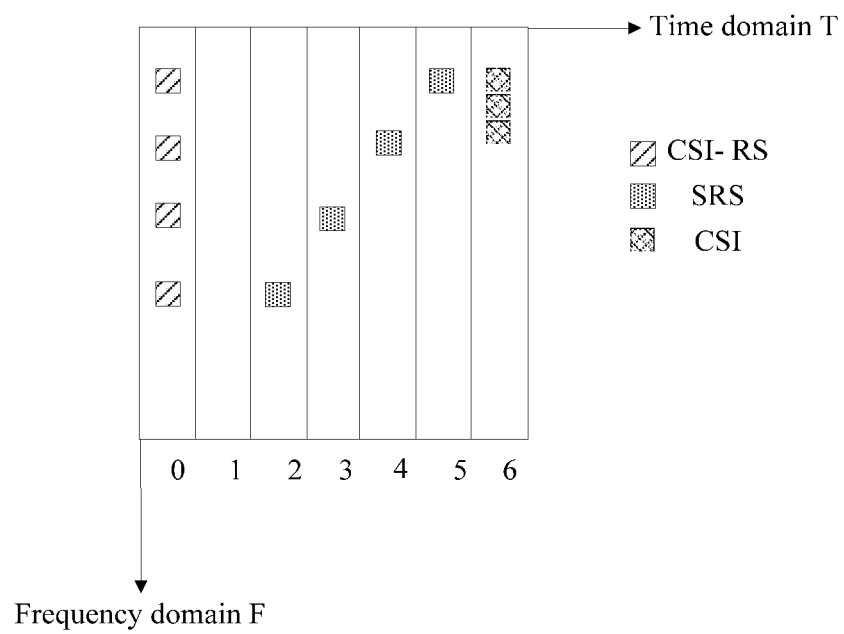
FIG. 9 is a schematic diagram of resources occupied by a reference signal resource, a first time-frequency resource, and a second time-frequency resource in a time domain unit according to an embodiment of this application.

FIG. 9 is a schematic diagram of resources occupied by a reference signal resource, a first time-frequency resource, and a second time-frequency resource in a time domain unit according to an embodiment of this application. One time domain unit includes n OFDM symbols (referred to as symbols below), and in FIG. 9, that n=7 is used as an example for description.

A CSI-RS occupies $X1^{th}$ to $X2^{th}$ symbols in the time domain unit, $0 \leq X1$, $X2=X1$ or $X1+m1$, and m1 is an integer greater than or equal to 1. For example, in FIG. 9, $X1=X2=0$.

An SRS occupies $X3^{th}$ to $X4^{th}$ symbols in the time domain unit, $X3=X2+m2$, m2 is an integer greater than or equal to 1, and $X3 \leq X4$. For example, in FIG. 9, $X3=2$, and $X4=5$.

CSI occupies $X5^{th}$ to $X6^{th}$ symbols in the time domain unit, and $X5 \leq X6 \leq n-1$. For example, in FIG. 9, $X5=X6=6$.

Figure 10:
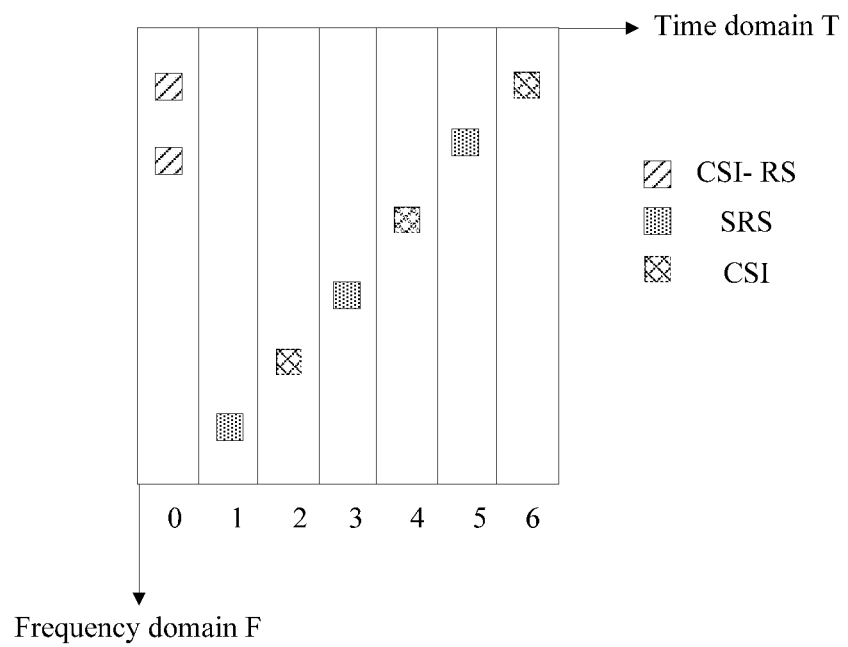
FIG. 10 is a schematic diagram of resources occupied by a reference signal resource, a first time-frequency resource, and a second time-frequency resource in a time domain unit according to an embodiment of this application.

FIG. 10 is a schematic diagram of resources occupied by a reference signal resource, a first time-frequency resource, and a second time-frequency resource in a time domain unit according to another embodiment of this application. One time domain unit includes n symbols, and in FIG. 10, that n=7 is used as an example for description.

A CSI-RS occupies $X1^{th}$ to $X2^{th}$ symbols in the time domain unit, $0 \leq X1$, $X2=X1$ or $X1+m1$, and m1 is an integer greater than or equal to 1. For example, in FIG. 10, $X1=X2=0$.

An SRS occupies odd-numbered symbols of $X3^{th}$ to $X4^{th}$ symbols in the time domain unit. For example, in FIG. 10, $X3=1$, $X4=6$, and the SRS occupies a first symbol, a third symbol, and a fifth symbol.

CSI occupies even-numbered symbols of $X3^{th}$ to $X4^{th}$ symbols in the time domain unit. For example, in FIG. 10, $X3=1$, $X4=6$, and the CSI occupies a second symbol, a fourth symbol, and a sixth symbol.

X3 is greater than or equal to X2, and $X3 \leq X4 \leq n-1$.

Figure 11:
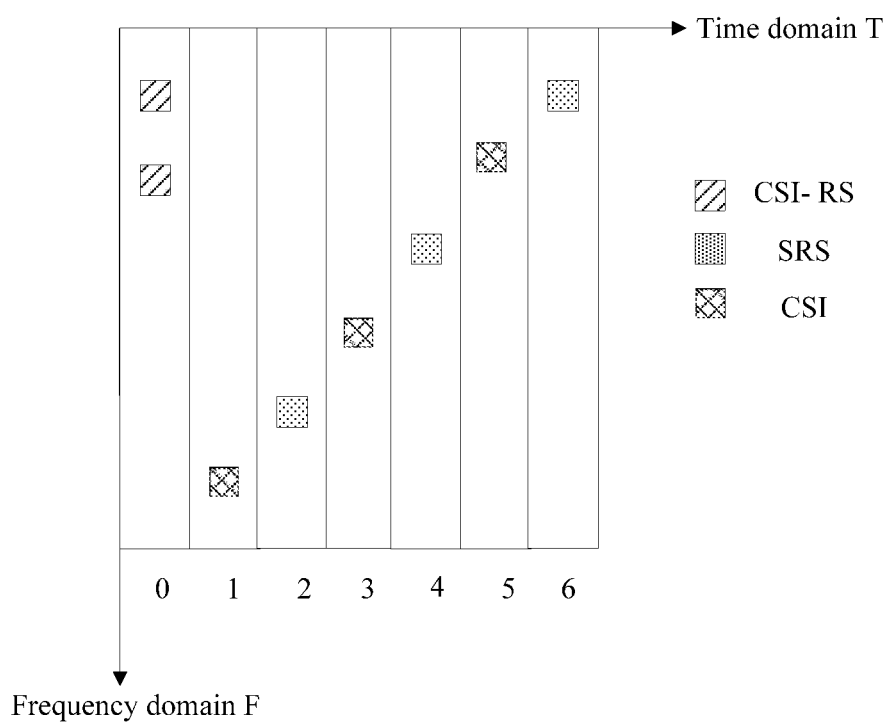
FIG. 11 is a schematic diagram of resources occupied by a reference signal resource, a first time-frequency resource, and a second time-frequency resource in a time domain unit according to an embodiment of this application.

FIG. 11 is a schematic diagram of resources occupied by a reference signal resource, a first time-frequency resource, and a second time-frequency resource in a time domain unit according to another embodiment of this application. One time domain unit includes n symbols, and in FIG. 11, that n=7 is used as an example for description.

A CSI-RS occupies $X1^{th}$ to $X2^{th}$ symbols in the time domain unit, $0 \leq X1$, $X2=X1$ or $X1+m1$, and m1 is an integer greater than or equal to 1. For example, in FIG. 11, $X1=X2=0$.

An SRS occupies even-numbered symbols of $X3^{th}$ to $X4^{th}$ symbols in the time domain unit. For example, in FIG. 10, $X3=1$, $X4=6$, and the SRS occupies a second symbol, a fourth symbol, and a sixth symbol.

CSI occupies odd-numbered symbols of the $X3^{th}$ to $X4^{th}$ symbols in the time domain unit. For example, in FIG. 10, $X3=1$, $X4=6$, and the CSI occupies a first symbol, a third symbol, and a fifth symbol.

$X2 \leq X3 \leq X4 \leq n-1$.

Figure 12A:
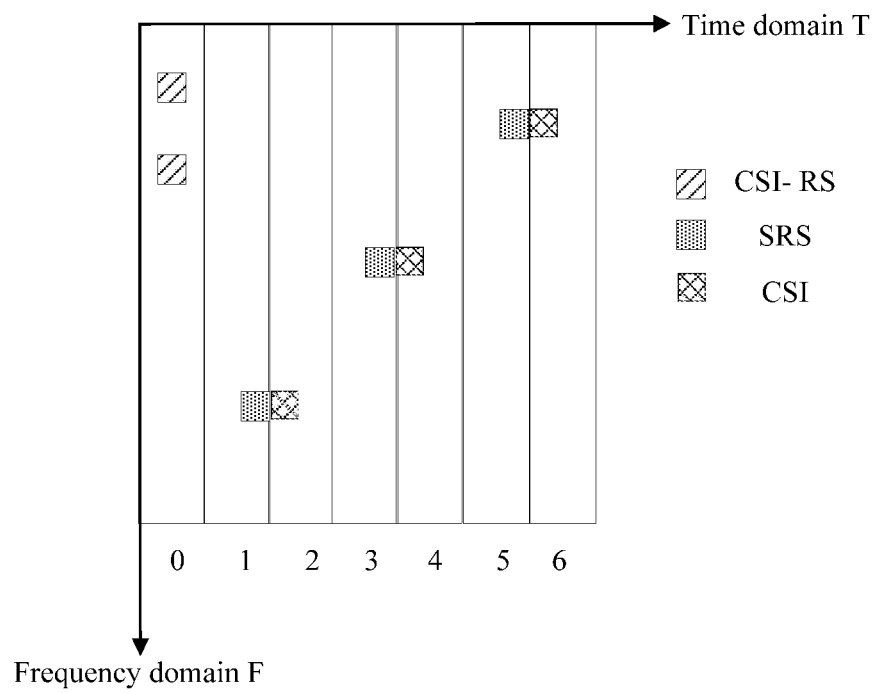
FIG. 12A is a schematic diagram of resources occupied by a reference signal resource, a first time-frequency resource, and a second time-frequency resource in a time domain unit according to an embodiment of this application.
Figure 12B:
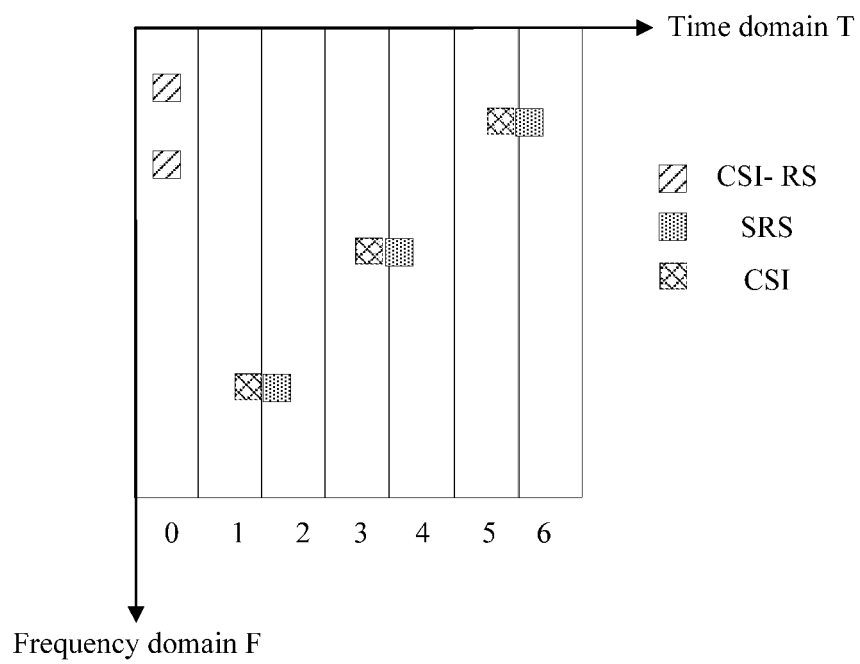
FIG. 12B is a schematic diagram of resources occupied by a reference signal resource, a first time-frequency resource, and a second time-frequency resource in a time domain unit according to an embodiment of this application.

In one embodiment, the SRS and the CSI in FIG. 10 and FIG. 11 sequentially and alternately occupy different OFDM symbols of $Z3^{th}$ to $Z4^{th}$ OFDM symbols. The SRS and the CSI may occupy different frequency bands in two neighboring OFDM symbols. Alternatively, the SRS and the CSI may occupy a same frequency band, as shown in FIG. 12A or FIG. 12B. In this case, the CSI uses the SRS as a demodulation pilot signal.

Figure 13:
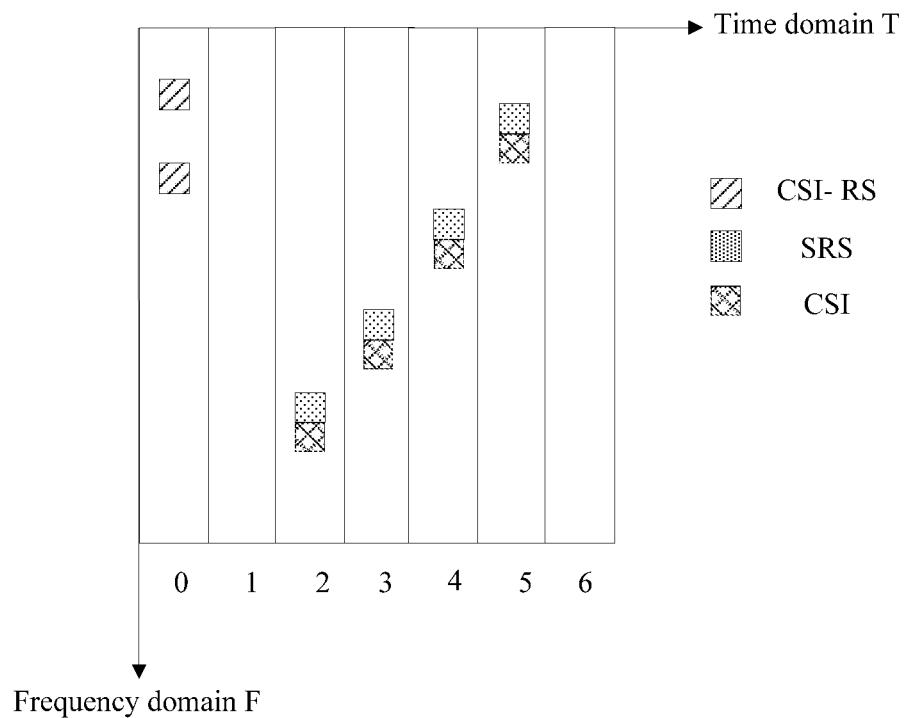
FIG. 13 is a schematic diagram of resources occupied by a reference signal resource, a first time-frequency resource, and a second time-frequency resource in a time domain unit according to an embodiment of this application.

FIG. 13 is a schematic diagram of resources occupied by a reference signal resource, a first time-frequency resource, and a second time-frequency resource in a time domain unit according to another embodiment of this application. One time domain unit includes n symbols, and in FIG. 13, that n=7 (where n is not limited to 7 and may be alternatively 14) is used as an example for description.

A CSI-RS occupies $X1^{th}$ to $X2^{th}$ symbols in the time domain unit, $0 \leq X1$, $X2=X1$ or $X1+m1$, and m1 is an integer greater than or equal to 1. For example, in FIG. 13, $X1=X2=0$.

An SRS occupies all of $X3^{th}$ to $X4^{th}$ symbols in the time domain unit. For example, in FIG. 12, $X3=2$, $X4=5$, and the SRS occupies a second symbol, a third symbol, a fourth symbol, and a fifth symbol.

CSI occupies all of the $X3^{th}$ to $X4^{th}$ symbols in the time domain unit, and the SRS and the CSI occupy different subcarriers.

$X2 \leq X3 \leq X4 \leq n-1$.

Figure 14:
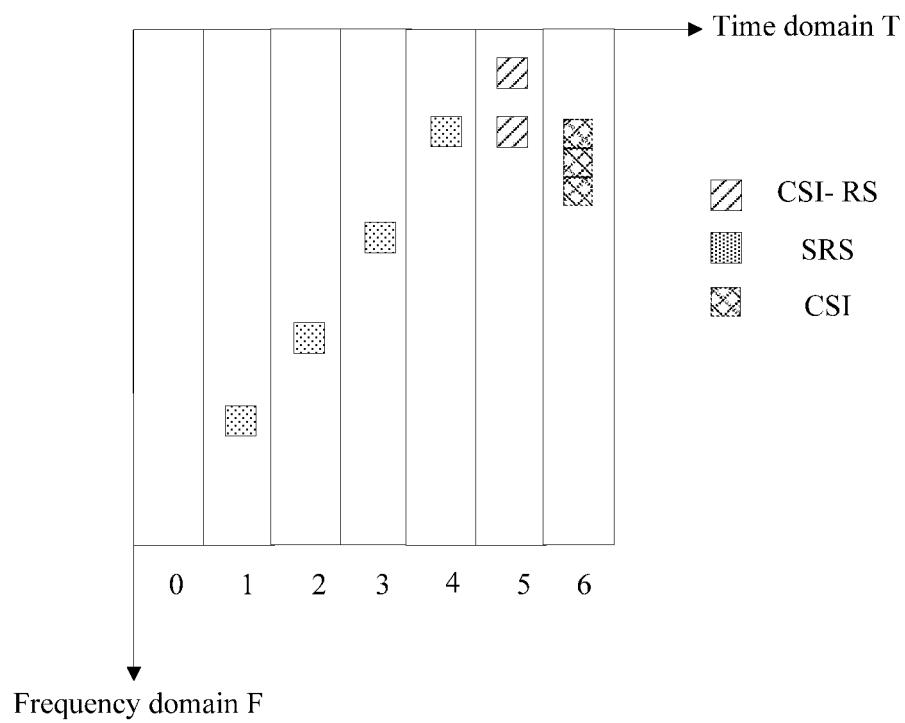
FIG. 14 is a schematic diagram of resources occupied by a reference signal resource, a first time-frequency resource, and a second time-frequency resource in a time domain unit according to an embodiment of this application.

FIG. 14 is a schematic diagram of resources occupied by a reference signal resource, a first time-frequency resource, and a second time-frequency resource in a time domain unit according to another embodiment of this application. One time domain unit includes n symbols (referred to as symbols below), and in FIG. 14, that n=7 is used as an example for description.

An SRS occupies $X1^{th}$ to $X2^{th}$ symbols in the time domain unit, $0 \leq X1$, $X2=X1$ or $X1+m1$, and m1 is an integer greater than or equal to 1. For example, in FIG. 12, $X1=1$, and $X2=4$.

A CSI-RS occupies $X3^{th}$ to $X4^{th}$ symbols in the time domain unit, X3=X2+m2, m2 is an integer greater than or equal to 1, and X4=X3 or X3+1. For example, in FIG. 12, X3=X4=5.

CSI occupies $X5^{th}$ to $X6^{th}$ symbols in the time domain unit, and X4<X5≤X6≤n−1. For example, in FIG. 12, X5=X6=6.

In one embodiment, because the SRS is sent before the CSI-RS, after receiving the SRS, an access network device measures an uplink channel of a terminal, determines a proper precoding matrix based on a measurement result, to precode CSI-RSs of a same frequency domain bandwidth, and sends the precoded CSI-RSs to the terminal. The terminal performs measurement based on the precoded CSI-RSs to obtain the CSI, and feeds back the CSI to the access network device.

Horizontal coordinates in FIG. 9 to FIG. 14 are the time domain T, and vertical coordinates are the frequency domain F.

In one embodiment, with reference to the schematic diagram of resource occupation shown in FIG. 9 to FIG. 14, the downlink configuration signaling may occupy first k symbols in one time domain unit, where k=1, 2, 3, or 4. In other words, a time domain resource occupied by the downlink configuration instruction, a time domain resource occupied by the reference signal resource, a time domain resource occupied by the SRS, and a time domain resource occupied by the first channel quality information belong to a same time domain unit.

It should be noted that when the downlink configuration signaling occupies a plurality of symbols, in the foregoing FIG. 8 to FIG. 14, 0≤X1≤k−1, or X1=k−1, or X1=k, or X1>k−1. This is not limited in this embodiment of this application.

In an alternative implementation, the time domain resource occupied by the downlink configuration instruction may be a symbol in an earlier time domain unit.

Figure 15:
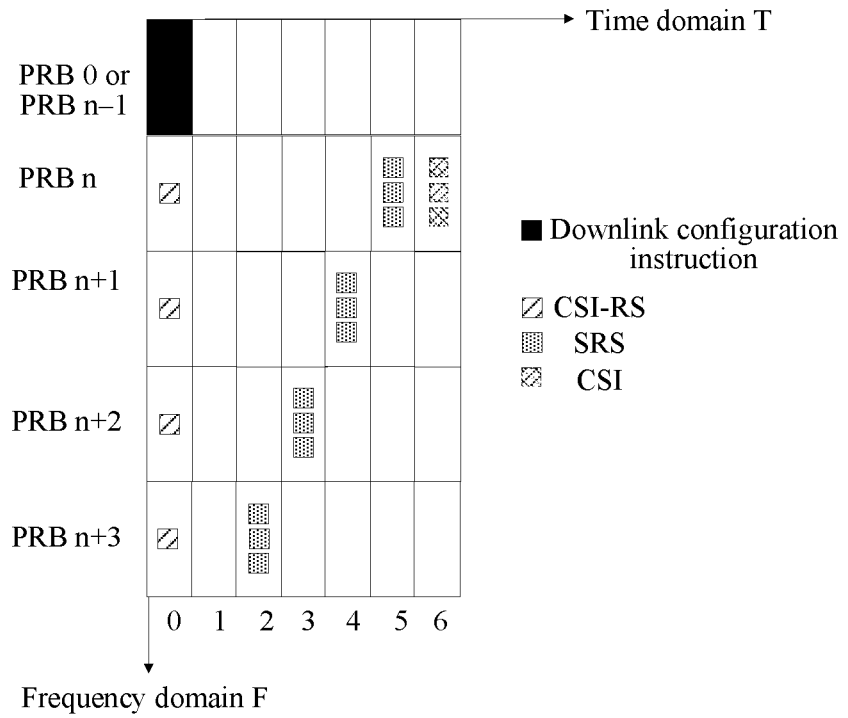
FIG. 15 is a schematic diagram of resources occupied by a downlink configuration instruction, a reference signal resource, a first time-frequency resource, and a second time-frequency resource on a segment of time-frequency resource according to another embodiment of this application.

FIG. 15 is a schematic diagram of resources occupied by a downlink configuration instruction, a reference signal resource, a first time-frequency resource, and a second time-frequency resource on a segment of time-frequency resource according to another embodiment of this application. The segment of time-frequency resource occupies n symbols (referred to as symbols below) in time domain, where in FIG. 15, that n=7 is used as an example for description, and occupies five PRBs in frequency domain.

Downlink configuration signaling occupies a $0^{th}$ symbol in time domain, and occupies a PRB 0 in frequency domain.

A CSI-RS occupies the $0^{th}$ symbol in time domain, and occupies a PRB n, a PRB n+1, a PRB n+2, and a PRB n+3 in frequency domain.

An SRS occupies a second symbol, a third symbol, a fourth symbol, and a fifth symbol in time domain, and occupies the PRB n, the PRB n+1, the PRB n+2, and the PRB n+3 in frequency domain.

CSI occupies a sixth symbol in time domain, and occupies the PRB n in frequency domain.

It can be learned from FIG. 15 that if the SRS occupies a plurality of frequency domain units (which are usually a plurality of PRBs), the SRS is transmitted in a frequency hopping manner in the plurality of frequency domain units, and the SRS occupies different frequency domain units in different symbols. In one embodiment, the plurality of frequency domain units occupied by the SRS belong to non-contiguous frequency domain bandwidths or contiguous frequency domain bandwidths.

It can be learned from FIG. 15 that in a same time domain unit, a frequency domain unit, namely, the PRB n, occupied by the CSI is the same as a frequency domain unit, namely, the PRB n, corresponding to a last symbol occupied by the SRS. In this case, an access network device uses the SRS as a demodulation pilot signal of the CSI.

Figure 16:
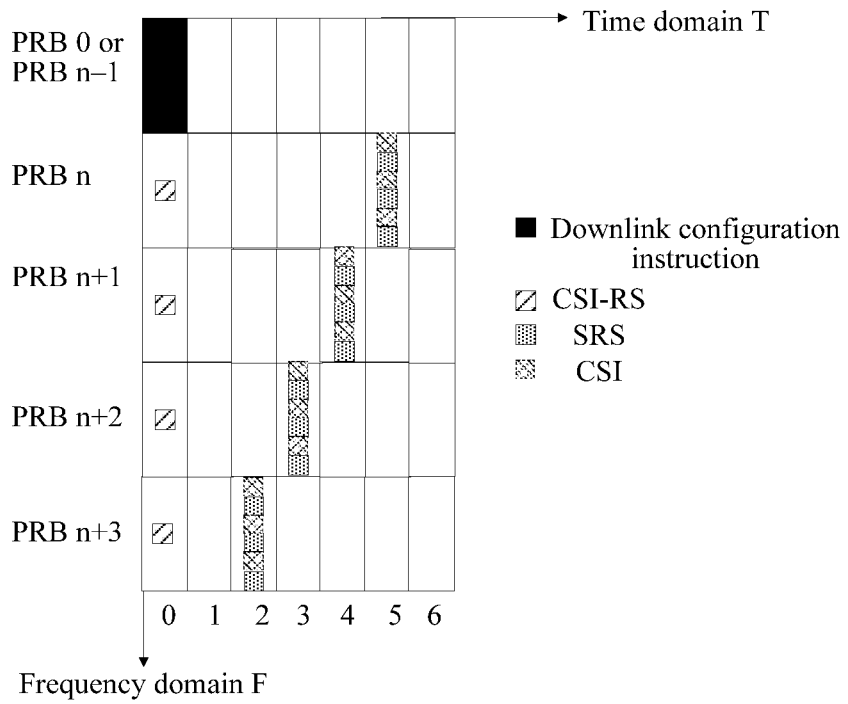
FIG. 16 is a schematic diagram of resources occupied by a downlink configuration instruction, a reference signal resource, a first time-frequency resource, and a second time-frequency resource on a segment of time-frequency resource according to another embodiment of this application.

FIG. 16 is a schematic diagram of resources occupied by a downlink configuration instruction, a reference signal resource, a first time-frequency resource, and a second time-frequency resource on a segment of time-frequency resource according to another embodiment of this application. The segment of time-frequency resource occupies n symbols (referred to as symbols below) in time domain, where in FIG. 16, that n=7 is used as an example for description, and occupies five PRBs in frequency domain.

Downlink configuration signaling occupies a $0^{th}$ symbol in time domain, and occupies a PRB 0 in frequency domain.

A CSI-RS occupies the $0^{th}$ symbol in time domain, and occupies a PRB n, a PRB n+1, a PRB n+2, and a PRB n+3 in frequency domain.

An SRS occupies a second symbol, a third symbol, a fourth symbol, and a fifth symbol in time domain, and occupies a first group of subcarriers in the PRB n, the PRB n+1, the PRB n+2, and the PRB n+3 in frequency domain.

CSI occupies the second symbol, the third symbol, the fourth symbol, and the fifth symbol in time domain, and occupies a second group of subcarriers in the PRB n, the PRB n+1, the PRB n+2, and the PRB n+3 in frequency domain.

The first group of subcarriers are odd-numbered subcarriers, and the second group of subcarriers are even-numbered subcarriers. Alternatively, the first group of subcarriers are even-numbered subcarriers, and the second group of subcarriers are odd-numbered subcarriers.

It can be learned from FIG. 16 that the SRS and the CSI occupy same symbols in time domain, and respectively occupy two groups of subcarriers within a same frequency domain bandwidth in frequency domain. The two groups of subcarriers respectively correspond to odd-numbered subcarriers and even-numbered subcarriers.

Alternatively, the SRS and the CSI occupy same symbols in time domain, and occupy a same frequency domain bandwidth in frequency domain. The SRS within an OFDM symbol is sent by using a Zadoff-Chu sequence and a different cyclic shift value. The cyclic shift value is used to indicate first channel quality information. For example, quantization intervals of the CSI in Table 1 are eight intervals, respectively corresponding to eight cyclic shifts. In a symbol, if a quantization interval corresponding to the CSI is a fifth interval, a corresponding cyclic shift CS=5. In this case, a cyclic shift 5 is performed on the Zadoff-Chu sequence to generate an SRS, and the SRS is sent to the access network device. Because the cyclic shift 5 of the SRS can indicate the quantization interval of the CSI, the CSI does not need to be explicitly indicated, and the cyclic shift 5 is directly used to indicate the CSI implicitly.

It should be noted that in some optional embodiments, the first channel quality information corresponds to at least one subband. In other words, the terminal feeds back first channel quality information corresponding to different subbands. For example, the reference signal resource (the resource occupied by the CSI-RS) is divided into at least two subbands, and each subband includes a plurality of PRBs. In this case, the terminal feeds back, in each subband, first channel quality information corresponding to the subband. In some other optional embodiments, the first channel quality information corresponds to a wideband corresponding to the reference signal resource. Even, in some optional embodiments, the first channel quality information corresponds to a wideband corresponding to an entire downlink bandwidth.

It should be further noted that in an optional embodiment, non-zero-power CSI-RSs between cells belonging to one cell group occupy a same time-frequency resource in a PRB; or non-zero-power CSI-RSs between all cells occupy a same time-frequency resource in a PRB.

The following is an apparatus embodiment in the embodiments of this application. For details not specifically described in the apparatus embodiment, refer to the foregoing corresponding method embodiment.

Figure 17:
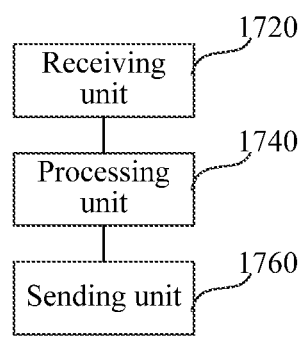
FIG. 17 is a block diagram of a channel quality information calculation apparatus according to another embodiment of this application.

FIG. 17 is a block diagram of a channel quality information calculation apparatus according to an embodiment of this application. The message sending apparatus may be implemented as an entire or a part of a terminal by using a dedicated hardware circuit or a combination of software and hardware. The message sending apparatus includes a receiving unit 1720, a processing unit 1740, and a sending unit 1760.

The receiving unit 1720 is configured to implement receiving functions of operation 402, operation 502, operation 602, and operation 702, and other implicit operations in which the terminal receives information.

The processing unit 1740 is configured to implement functions of operation 403, operation 504, operation 507, operation 604, operation 607, operation 704, and operation 707, and other implicit operations in which the terminal processes information or other implicit data.

The sending unit 1760 is configured to implement sending functions of operation 404, operation 406, operation 505, operation 508, operation 605, operation 608, operation 705, and operation 708, and other implicit operations in which the terminal sends information.

For related details, refer to the method embodiment shown in FIG. 4, FIG. 5, FIG. 6, or FIG. 7.

It should be noted that the foregoing receiving unit 1720 may be implemented by using a receiver, or may be implemented by using a processor in cooperation with a receiver. The foregoing processing unit 1740 may be implemented by using a processor, or may be implemented by a processor executing a program instruction in a memory. The foregoing sending unit 1760 may be implemented by using a transmitter, or may be implemented by using a processor in cooperation with a transmitter.

Figure 18:
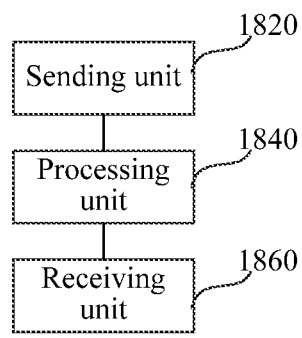
FIG. 18 is a block diagram of a channel quality information calculation apparatus according to another embodiment of this application.

FIG. 18 is a block diagram of a channel quality information calculation apparatus according to another embodiment of this application. The message sending apparatus may be implemented as an entire or a part of an access network terminal or a first access network device by using a dedicated hardware circuit or a combination of software and hardware. The message sending apparatus includes a sending unit 1820, a processing unit 1840, and a receiving unit 1860.

The sending unit 1820 is configured to implement sending functions of operation 401, operation 501, operation 503, operation 601, operation 603, and operation 701, and other implicit operations in which the access network terminal sends information.

The processing unit 1840 is configured to implement operation 408, operation 510, operation 610, and operation 710, and other implicit operations in which the access network device processes information.

The receiving unit 1860 is configured to implement receiving functions of operation 405, operation 407, operation 506, operation 509, operation 606, operation 609, operation 706, and operation 709, and other implicit operations in which the access network device receives information.

For related details, refer to the method embodiment shown in FIG. 4, FIG. 5, FIG. 6, or FIG. 7.

It should be noted that the foregoing sending unit 1820 may be implemented by using a transmitter, or may be implemented by using a processor in cooperation with a transmitter. The foregoing processing unit 1840 may be implemented by using a processor, or may be implemented by a processor executing a program instruction in a memory. The foregoing receiving unit 1860 may be implemented by using a receiver Rx, or may be implemented by using a processor in cooperation with a receiver.

The sequence numbers of the foregoing embodiments of this application are merely for illustrative purposes, and are not intended to indicate priorities of the embodiments.

A person of ordinary skill in the art may understand that all or some of the operations of the embodiments may be implemented by hardware or a program instructing related hardware. The program may be stored in a computer-readable storage medium. The storage medium may include: a read-only memory, a magnetic disk, or an optical disc.

The foregoing descriptions are merely preferred embodiments of this application, but are not intended to limit this application. Any modification, equivalent replacement, or improvement made without departing from the spirit and principle of this application should fall within the protection scope of this application.

What is claimed is:

1. A channel quality information calculation method, comprising:
   receiving, by a terminal, a downlink configuration instruction sent by an access network device, wherein the downlink configuration instruction configures a reference signal resource, which is a time-frequency resource occupied by a downlink reference signal;
   performing, by the terminal, measurement on the reference signal resource configured by the downlink configuration instruction to obtain first channel quality information;
   sending, by the terminal, the first channel quality information to the access network device, wherein the first channel quality information is used to feed back received signal information or interference information obtained through measurement on the reference signal resource; and
   sending, by the terminal, a sounding reference signal (SRS) to the access network device, wherein the first channel quality information and the SRS are used to calculate second channel quality information.

2. The method according to claim 1, wherein the first channel quality information comprises:
   the received signal information; or
   a ratio of the received signal information to reference signal received power (RSRP) that is reported by the terminal.

3. The method according to claim 2,
   wherein the reference signal resource corresponds to a plurality of reference signal ports; and
   wherein the received signal information comprises one or more of the following types of information;
   information about a received signal that is on each reference signal port and that is measured on each receive antenna;

elements of a covariance matrix of the received signal;
main diagonal elements of the covariance matrix of the received signal;
one of the main diagonal elements of the covariance matrix of the received signal;
an average value of the main diagonal elements of the covariance matrix of the received signal;
one of the main diagonal elements of the covariance matrix of the received signal, and differential values of other main diagonal elements relative to the main diagonal element; or
the average value of the main diagonal elements of the covariance matrix of the received signal, and differential values of the main diagonal elements relative to the average value.

4. The method according to claim 1, wherein the first channel quality information comprises:
the interference information; or
a ratio of the interference information to reference signal received power (RSRP) that is reported by the terminal.

5. The method according to claim 4, wherein the interference information comprises one or more of the following types of information:
the interference signal that is on each reference signal port and that is measured on each receive antenna;
a covariance matrix of the interference signal;
main diagonal elements of the covariance matrix of the interference signal;
one of the main diagonal elements of the covariance matrix of the interference signal;
an average value of the main diagonal elements of the covariance matrix of the interference signal;
one of the main diagonal elements of the covariance matrix of the interference signal, and differential values of other main diagonal elements relative to the main diagonal element; or
the average value of the main diagonal elements of the covariance matrix of the interference signal, and differential values of the main diagonal elements relative to the average value.

6. A channel quality information calculation method, comprising:
sending, by an access network device, a downlink configuration instruction to a terminal, wherein the downlink configuration instruction configures a reference signal resource, which is a time-frequency resource occupied by a downlink reference signal;
receiving, by the access network device, first channel quality information sent by the terminal, wherein the first channel quality information is obtained by the terminal through measurement on the reference signal resource configured by the downlink configuration instruction; and
receiving, by the access network device, a sounding reference signal (SRS) sent by the terminal according to the downlink configuration instruction, wherein the first channel quality information and the SRS are used to calculate second channel quality information.

7. The method according to claim 6, further comprising:
obtaining, by the access network device, received signal information of the terminal from the first channel quality information;
performing, by the access network device, calculation based on the SRS, to obtain channel estimation information of a downlink channel of the terminal;
performing, by the access network device, calculation based on the received signal information and the channel estimation information of the downlink channel, to obtain interference information; and
performing, by the access network device, calculation based on the interference information and the channel estimation information of the downlink channel, to obtain a signal-to-noise ratio (SNR) of the downlink channel, and determining the SNR as the second channel quality information.

8. The method according to claim 6, further comprising:
obtaining, by the access network device, interference information of the terminal from the first channel quality information;
performing, by the access network device, calculation based on the SRS, to obtain channel estimation information of a downlink channel of the terminal; and
performing, by the access network device, calculation based on the interference information and the channel estimation information of the downlink channel, to obtain a signal-to-noise ratio (SNR) of the downlink channel, and determining the SNR as the second channel quality information.

9. A channel quality information calculation apparatus, wherein the apparatus comprises:
a receiver, configured to receive a downlink configuration instruction sent by an access network device, wherein the downlink configuration instruction configures a reference signal resource, which is a time-frequency resource occupied by a downlink reference signal;
a processor configured to: perform measurement on the reference signal resource configured by the downlink configuration instruction, to obtain first channel quality information, and send the first channel quality information to the access network device, wherein the first channel quality information is used to feed back received signal information or interference information obtained through measurement on the reference signal resource; and
a transmitter configured to send a sounding reference signal (SRS) to the access network device, wherein the first channel quality information and the SRS are used to calculate second channel quality information.

10. The apparatus according to claim 9, wherein the first channel quality information comprises:
the received signal information; or
a ratio of the received signal information to reference signal received power (RSRP) that is reported by the terminal.

11. The apparatus according to claim 10,
wherein the reference signal resource corresponds to a plurality of reference signal ports; and
wherein the received signal information comprises one of more of the following types of information:
information about a received signal that is on each reference signal port and that is measured on each receive antenna;
elements of a covariance matrix of the received signal;
main diagonal elements of the covariance matrix of the received signal;
one of the main diagonal elements of the covariance matrix of the received signal;
an average value of the main diagonal elements of the covariance matrix of the received signal;
one of the main diagonal elements of the covariance matrix of the received signal, and differential values of other main diagonal elements relative to the main diagonal element; or the average value of the main diagonal elements of the covariance matrix of the received signal, and differential values of the main diagonal elements relative to the average value.

12. The apparatus according to claim 9, wherein the first channel quality information comprises:
the interference information; or
a ratio of the interference information to reference signal received power (RSRP) that is reported by the terminal.

13. The apparatus according to claim 12, wherein the interference information comprises one or more of the following types of information:
the interference signal that is on each reference signal port and that is measured on each receive antenna;
a covariance matrix of the interference signal;
main diagonal elements of the covariance matrix of the interference signal;
one of the main diagonal elements of the covariance matrix of the interference signal; or
an average value of the main diagonal elements of the covariance matrix of the interference signal;
one of the main diagonal elements of the covariance matrix of the interference signal, and differential values of other main diagonal elements relative to the main diagonal element; or the average value of the main diagonal elements of the covariance matrix of the interference signal, and differential values of the main diagonal elements relative to the average value.

14. A channel quality information calculation apparatus, comprising:
a transmitter, configured to send a downlink configuration instruction to a terminal, wherein the downlink configuration instruction configures a reference signal resource, which is a time-frequency resource occupied by a downlink reference signal; and
a receiver configured to receive first channel quality information sent by the terminal;
wherein the first channel quality information is obtained by the terminal through measurement on the reference signal resource configured by the downlink configuration instruction;
wherein the receiver is further configured to receive a sounding reference signal (SRS) sent by the terminal according to the downlink configuration instruction;
wherein the first channel quality information and the SRS are used to calculate second channel quality information.

15. The apparatus according to claim 14, wherein the processor further is configured to
obtain interference information of the terminal from the first channel quality information;
perform calculation based on the SRS, to obtain channel estimation information of a downlink channel of the terminal; and
perform calculation based on the interference information and the channel estimation information of the downlink channel, to obtain a signal-to-noise ratio (SNR) of the downlink channel, and determine the SNR as the second channel quality information.

* * * * *